(12) United States Patent
Hayakawa et al.

(10) Patent No.: US 6,803,423 B2
(45) Date of Patent: Oct. 12, 2004

(54) (METH)ACRYLOYL GROUP-MODIFIED ETHYLENE-ALPHA-OLEFIN COPOLYMER, PRODUCTION METHOD THEREOF AND RUBBER COMPOSITION

(75) Inventors: Toshiyuki Hayakawa, Tokyo (JP); Toshihiro Nishimura, Tokyo (JP); Motoharu Higuchi, Tokyo (JP); Minoru Tanaka, Tokyo (JP); Shoei Tsuji, Tokyo (JP)

(73) Assignee: JSR Corporation, Tokyo (JP)

( * ) Notice: Subject to any disclaimer, the term of this patent is extended or adjusted under 35 U.S.C. 154(b) by 213 days.

(21) Appl. No.: 10/171,535

(22) Filed: Jun. 17, 2002

(65) Prior Publication Data
US 2003/0045648 A1 Mar. 6, 2003

(30) Foreign Application Priority Data

Jun. 15, 2001 (JP) ........................................ 2001-181818
Nov. 9, 2001 (JP) ........................................ 2001-344496

(51) Int. Cl.$^7$ ........................................... C08F 255/02
(52) U.S. Cl. .................. 525/298; 525/193; 525/286; 525/288; 525/291; 525/293; 525/296; 525/300; 525/301; 525/303; 525/309; 525/310; 522/149; 252/182.13; 252/182.18
(58) Field of Search ................... 525/298, 300, 525/193, 286, 288, 291, 292, 293, 296, 301, 303, 309, 310; 252/182.13, 182.18; 560/205, 219; 522/149

(56) References Cited

U.S. PATENT DOCUMENTS

| | | | | |
|---|---|---|---|---|
| 3,649,335 A | * | 3/1972 | Wiggill | 428/451 |
| 4,117,036 A | * | 9/1978 | Honda et al. | 524/13 |
| 5,502,114 A | * | 3/1996 | Murakami et al. | 525/301 |
| 6,107,405 A | * | 8/2000 | Wang et al. | 525/193 |
| 6,177,524 B1 | * | 1/2001 | Ohtsuka et al. | 525/531 |

OTHER PUBLICATIONS

Hackh's Chemical Dictionary, 4$^{th}$ ed., J. Grant (ed.), McGraw–Hill, N.Y., p. 199 (1969).*

* cited by examiner

*Primary Examiner*—Fred Teskin
(74) *Attorney, Agent, or Firm*—Oblon, Spivak, McClelland, Maier & Neustadt, P.C.

(57) ABSTRACT

An (meth)acryloyl group-modified ethylene-α-olefin copolymer (A) which has (meth)acryloyl group as a the side-chain thereof, wherein the intrinsic viscosity [η] was 0.01 to 10 dl/g measured in decalin at a temperature of 135° C.; and a rubber composition which comprises said (meth)acryloyl group-modified ethylene-α-olefin copolymer, a vulcanizing agent, and/or a crosslinking agent; in addition, a liquid curable rubber composition which comprises, component (A), reactive diluent (D), and if necessary, photopolymerization initiator (E).

19 Claims, 1 Drawing Sheet

(METH)ACRYLOYL GROUP-MODIFIED ETHYLENE-ALPHA-OLEFIN COPOLYMER, PRODUCTION METHOD THEREOF AND RUBBER COMPOSITION

FIELD OF THE INVENTION

This invention relates to a modified ethylene-α-olefin copolymer obtained by modifying ethylene-α-olefin copolymer with a (meth)acryloyl group, more particularly to a modified ethylene-α-olefin copolymer improved in crosslinking efficiency by introducing a specific functional group ((meth)acryloyl group). Further, this invention relates to a crosslinkable modified ethylene-α-olefin copolymer rubber composition which comprises the above modified ethylene-α-olefin copolymer and has excellent processability, mechanical strength, and abrasion resistance, and is excellent as a rubber material used in automobile components, machinery components, electronic components, materials for civil engineering and construction, fuel cell packing and the like.

Furthermore, this invention relates to a liquid curable rubber composition using the above modified ethylene-α-olefin copolymer improved in closslinking efficiency by introducing a specific functional group "(meth)acryloyl group". Particularly, it is related to a liquid curable rubber composition including a reactive diluent and if required, a photopolymerization initiator, which composition is able to be cured by light or electron beam, and molded body thereof. They are excellent in rubber-elasticity properties such as processability of casting properties, mechanical strength and compression set property, and preferably used for rubber materials such as automobile components, mechanical components, electronic components, batteries, fuel cells, capacitors, ultracapacitors, packing materials for civil engineering and construction, gaskets, sealing materials, semiconductor sealants, mounting materials, liquid crystal display materials and various negative photo-resists.

BACKGROUND OF THE INVENTION

Ethylene-α-olefin copolymer and ethylene-α-olefin-unconjugated polyene copolymer (hereinafter referred as "ethylene-α-olefin copolymer") have excellent properties in heat resistance and weather resistance and the like, and are used in a wide variety of fields.

However, compared with diene rubbers such as natural rubber, styrene-butadiene rubber, isoprene rubber, butadiene rubber, nitrile rubber and the like, conventional ethylene-α-olefin copolymer has a slower crosslinking rate and it is difficult to produce crosslinked rubber therefrom efficiently.

It is possible to increase the crosslinking rate of ethylene-α-olefin copolymer by adding a large amount of crosslinking agent. However, if a large amount of crosslinking agent is used for crosslinking, blooming of the crosslinking agent tends to occur on the resulting crosslinked rubber surface, which is not favorable from a viewpoint of hygienic conditions.

Also, it is known in JP-A-2-51512 and JP-A-6-128427 that use of an unconjugated polyene typified by 7-methyl-1,6-octadiene increases crosslinking rate, but resulting crosslinking rate is not sufficient.

On the other hand, concerning the production of modified olefin copolymer, it is known of a method of graft reaction of maleic anhydride and the like within an extruder; a method of chemical modification of the unsaturated bond in the side-chain of the copolymer introduced by copolymerization; a method of copolymerization by radical polymerization under high temperature/high pressure; and a method of copolymerization of a functional group containing monomer with an olefin by masking specific functional group.

Using these modified olefin copolymers, a method of substitution of a hydrolyzable group bound to a silicon atom by using unsaturated alcohol such as allyl alcohol after copolymerization of ethylene, a mono-olefin having 3 to 20 carbon atoms and ethylene organosilane is known as a producing method of olefin copolymers having an unsaturated group as a side-chain introduced by chemical reaction (see JP-B-58-38443). Besides, JP-A-62-121715 discloses a modified olefin copolymer produced by grafting carboxylate compound to olefin copolymer and reacting the grafted olefin copolymer with monovalent unsaturated amine and/or unsaturated alcohol. However, there are no descriptions of (meth)acryloyl group modification.

Further, in relation to polyolefins having (meth)acryloyl group, terminally modified polyolefins are known (see JP-B-3164632). However, these polyolefins only have (meth)acryloyl group at their termini, thus olefin copolymers having (meth)acryloyl group as a random side-chain are not known. Furthermore, there are no descriptions whatsoever concerning improvement in a crosslinking rate of modified olefin copolymers having (meth)acryloyl group.

SUMMARY OF THE INVENTION

It is an object of the present invention is to provide a crosslinkable modified ethylene-α-olefin copolymer and its rubber composition which has excellent processability, mechanical strength, and abrasion resistance, and is excellent as a rubber material used in automobile components, machinery components, electronic components, materials for civil engineering and construction, fuel cell packing and the like.

Another object of the present invention is to provide a liquid curable rubber composition and its molded body, using modified ethylene-α-olefin copolymer wherein the rubber composition is able to be cured by light or electron beam, by introducing a specific functional group as a side-chain of the copolymer, in order to enhance processability such as casting properties, rubber elasticity such as mechanical strength and compression set property and the like; and is excellent for use of automobile components, machinery components, electronic components, batteries, fuel cells, capacitors, ultracapacitors, packing materials for civil engineering and construction, gaskets, rubber materials such as sealing materials, semiconductor sealants, mounting materials, liquid crystal display materials, and various negative photo-resists.

According to the invention, provided is, (A) (meth) acryloyl group-modified ethylene-α-olefin copolymer having a (meth)acryloyl group as a side-chain thereof, and the intrinsic viscosity [η] of the (meth)acryloyl group-modified ethylene-α-olefin copolymer is in the range of 0.01 to 10 dl/g measured in decalin at a temperature of 135° C. (hereinafter, may referred as "(A) (meth)acryloyl group-modified ethylene-α-olefin copolymer").

It is preferable that (A) (meth)acryloyl group-modified ethylene-α-olefin copolymer of the invention comprises (meth)acryloyl group in an amount of 0.1 to 500 mmol per 100 g of the (meth)acryloyl group-modified ethylene-α-olefin copolymer.

Also, (A) (meth)acryloyl group-modified ethylene-α-olefin copolymer of the invention is provided by reacting a functional group-containing ethylene-α-olefin copolymer which has at least one functional group selected from the group consisting of silyl group, hydroxyl group, alkoxyl group, amino group, carboxyl group, ester group, epoxy group, amide group, sulfone group, imido group, isocyanate group, vinyl group, vinylene group and acid anhydride group, with a (meth)acryloyl group-containing compound.

Examples of the above-mentioned (meth)acryloyl group-containing compound are represented by the following general formula (1):

(wherein $R^1$ represents hydrogen atom or methyl group; "A" represents a hydrocarbon group having 1 to 20 carbon atoms which may comprise a hetero-atom, or "A" represents a single bond; $X^1$ represents silyl group, hydroxyl group, amino group, carboxyl group, epoxy group, amide group, sulfone group, imido group, isocyanate group, mercapto group, or a halogen atom; and "q" is an integer of 1 to 3.)

As for an example of the functional group-containing ethylene-α-olefin copolymer, it may be a copolymer obtained by copolymerizing a compound represented by the following general formula (2), ethylene, an α-olefin having 3 to 10 carbon atoms, and if necessary, an unconjugated polyene.

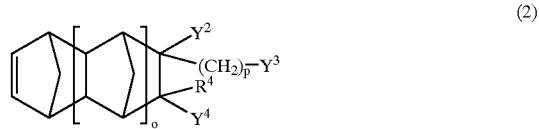

(wherein $R^4$ represents hydrogen atom or a hydrocarbon group having 1 to 10 carbon atoms; each of $Y^2$, $Y^3$ and $Y^4$, independently represents hydrogen atom, a hydrocarbon group having 1 to 10 carbon atoms, or a functional group selected from the group consisting of silyl group, hydroxyl group, alkoxyl group, amino group, carboxyl group or amide group, wherein at least one of $Y^2$, $Y^3$ and $Y^4$ is a functional group, wherein if two or more of $Y^2$, $Y^3$ and $Y^4$ are functional groups, the two or more may be an acid anhydride group (—(CO)—O—(CO)—) or imido group (—CO—NH—CO—) formed by bonding to each other; "o" is an integer of 0 to 2; and "p" is an integer of 0 to 5.)

At least one of $Y^2$, $Y^3$ and $Y^4$ of the compound represented by general formula (2) is preferably a functional group represented by —SiR$^3_m$Z$_{3-m}$, wherein $R^3$ represents hydrogen atom or a hydrocarbon group having 1 to 20 carbon atoms which may comprise a hetero-atom, "Z" represents a halogen atom selected from the group consisting of chlorine atom, bromine atom and iodine atom, and "m" is an integer of 0 to 2.

Further, as for an example of the functional group-containing ethylene-α-olefin copolymer, it may be a copolymer provided by copolymerizing a compound represented by the following general formula (3), ethylene, an α-olefin having 3 to 10 carbon atoms, and if necessary, an unconjugated polyene.

(wherein $Y^1$ represents a functional group selected from the group consisting of silyl group, hydroxyl group, alkoxyl group, amino group, carboxyl group or amide group; and "n" is an integer of 0 to 6.)

Here, $Y^1$ of the compound represented by general formula (3) is preferably a functional group represented by —SiR$^3_m$Z$_{3-m}$, wherein $R^3$ represents hydrogen atom, or a hydrocarbon group having 1 to 20 carbon atoms which may comprise a hetero-atom, "Z" represents a halogen atom selected from the group consisting of chlorine atom, bromine atom and iodine atom and "m" is an integer of 0 to 2.

(A) (meth)acryloyl group-modified ethylene-α-olefin copolymer of the invention is preferably obtained by reacting a functional group-containing ethylene-α-olefin copolymer having an intrinsic viscosity [η] in the range of 0.01 to 10 dl/g measured in decalin at a temperature of 135° C., and comprising 0.01 to 30 mol % of a structural unit (a-1) derived from a compound represented by said general formula (2), 5 to 90 mol % of a structural unit (a-2) derived from ethylene, 5 to 60 mol % of a structural unit (a-3) derived from an α-olefin having 3 to 10 carbon atoms and 0 to 12 mol % of a structural unit (a-4) derived from an unconjugated polyene compound; with the compound represented by the above-mentioned general formula (1).

Also, (A) (meth)acryloyl group-modified ethylene-α-olefin copolymer of the invention is preferably obtained by reacting a functional group-containing ethylene-α-olefin copolymer which having an intrinsic viscosity [η] in the range of 0.01 to 10 dl/g measured in decalin at a temperature of 135° C., and comprising 0.01 to 30 mol % of a structural unit (a-1) derived from a compound represented by said general formula (3), 5 to 90 mol % of a structural unit (a-2) derived from ethylene, 5 to 60 mol % of a structural unit (a-3) derived from an α-olefin having 3 to 10 carbon atoms and 0 to 12 mol % of a structural unit (a-4) derived from an unconjugated polyene compound; with the compound represented by the above-mentioned general formula (1).

Next, this invention relates to a (meth)acryloyl group-modified ethylene-α-olefin copolymer-containing rubber composition (hereinafter may referred as "rubber composition of the invention") characterized in comprising;

(A) above-mentioned (meth)acryloyl group-modified ethylene-α-olefin copolymer, and (B) vulcanizing agent and/or a crosslinking agent.

The rubber composition of the invention may further comprise (C) olefin copolymer rubber, other than component (A).

The invention relates to a liquid curable rubber composition (hereinafter may referred as "liquid curable rubber composition"), characterized in comprising;

(A) above-mentioned (meth)acryloyl group-modified ethylene-α-olefin copolymer, (D) reactive diluent, and if necessary, (E) a photopolymerization initiator.

It is preferably that the weight average molecular weight (Mw) of the above-mentioned component (A) comprised in the liquid curable rubber composition is in the range of 500 to 200,000 measured by gel permeation chromatography (GPC) in o-dichlorobenzene at a temperature of 135° C.

As for the weight ratio of the above-mentioned components (A), (D) and (E), the weight ratio of component (E) is in a range of 0.01 to 10 parts based on total (100 parts) of component (A) and component (D), wherein the weight ratio of component (A) is 20 to 100 parts and the weight ratio of component (D) is 80 to 0 part.

Next, the present invention relates to a molded body which is formed by subjecting the above-mentioned liquid curable rubber composition to a light curing process or an electron-beam curing process.

DESCRIPTION OF THE PREFERRED EMBODIMENTS

Figure 1:
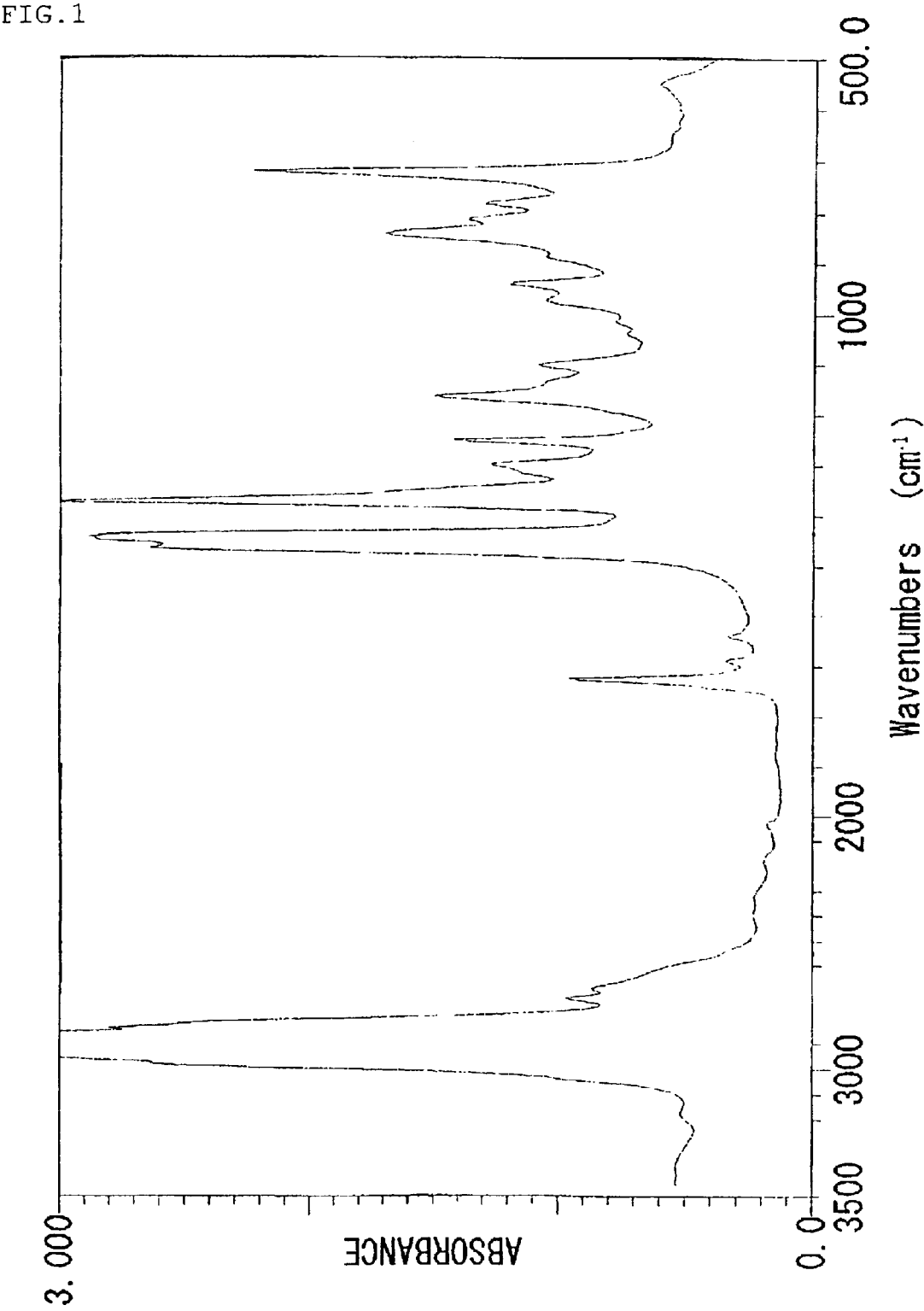
FIG. 1 is an IR chart of the olefin copolymer (A1) obtained in Example 1.

Specific description of the preferred embodiments of the invention is as follows.

In production of (A) (meth)acryloyl group-modified ethylene-α-olefin copolymer (hereinafter, may referred as "olefin copolymer (A)") of the invention, firstly an ethylene-α-olefin copolymer having functional group (hereinafter, may referred as "functional group-containing ethylene-α-olefin copolymer") is produced by introducing a functional group into an ordinary ethylene-α-olefin copolymer. Production of functional group-containing ethylene-α-olefin copolymer is already established in the art. For example, in the specification of U.S. Pat. No. 3,236,917, there is a description of a producing method using graft reaction of ethylene-propylene copolymer and maleic anhydride. Further, JP-A-64-9211 discloses a method of grafting glycidyl methacrylate to ethylene-propylene copolymer. JP-A-6-211938 discloses a method of introducing functional groups such as hydroxyl group, carboxyl group, epoxy group, halogen group, nitro group, amino group, sulfonic group and the like; to the reactive unsaturated group residing in a reactive unsaturated group-containing olefin copolymer obtained by copolymerization of α-olefin with unconjugated diene. Also, olefin copolymers obtained by copolymerizing olefin monomers having a functional group such as carboxyl groups and amino groups are known (see JP-B-49-43275, JP-A(Tokkyokohyo)-4-503963).

By reacting the functional group of functional group-containing ethylene-α-olefin copolymer obtained by the above-mentioned methods, with the compound represented by general formula (1), it is possible to introduce (meth)acryloyl group into ethylene-α-olefin copolymers.

This introducing method is not particularly restricted and may be conducted in solution state, molten state, or solid state, and in order to accelerate the reaction, known catalysts may be added.

For producing the olefin copolymer (A) of the invention, the following method of introducing (meth)acryloyl group to ethylene-α-olefin copolymer is preferable because it is possible to introduce(meth)acryloyl group without isolating the resulting polymer after polymerization. In the following method, the compound represented by the above-mentioned general formula (2) wherein at least one of $Y^2$, $Y^3$ and $Y^4$ is a functional group or the unsaturated silane compound represented by the above-mentioned general formula (3) wherein the functional group $Y^1$ is represented by $-SiR^3{}_mZ_{3-m}$, is copolymerized firstly with ethylene, an α-olefin and if necessary, an unconjugated polyene, then the resulting copolymer is reacted with the compound represented by general formula (1).

Specific examples represented by the above-mentioned general formula (1) include aminoethyl acrylate, glycidyl acrylate, 2-hydroxyethyl acrylate, 2-hydroxypropyl acrylate, hydroxybutyl acrylate, 4-hydroxyphenyl acrylate, glycidyl methacrylate, aminoethyl methacrylate, 2-hydroxyethyl methacrylate, 2-hydroxypropyl methacrylate, hydroxybutyl methacrylate, 4-hydroxyphenyl methacrylate, 4-hydroxyphenylethyl methacrylate, pentaerythritol triacrylate, pentaerythritol trimethacrylate, acrylic acid, acrylamide, acrylate chloride, methacrylic acid, methacrylamide, methacrylate chloride and the like.

Among these compounds, 2-hydroxyethyl methacrylate, hydroxybutyl methacrylate, 4-hydroxyphenyl methacrylate and 4-hydroxyphenylethyl methacrylate are preferable because of the stability of the modified copolymer.

These compounds can be used alone or in admixture of two or more.

Specific examples of the compound represented by the above-mentioned general formula (2) wherein at least one functional group of $Y^2$, $Y^3$ and $Y^4$ is an unsaturated silane compound represented by $-SiR^3{}_mZ_{3-m}$ include 5-trichlorosilyl-2-norbornene, 5-methyldichlorosilyl-2-norbornene, 5-dimethylchlorosilyl-2-norbornene, 5-{2-(dimethylchlorosilyl)ethyl}bicyclo[2.2.1]hept-2-ene, 5-{2-(methyldichlorosilyl)ethyl}bicyclo[2.2.1]hept-2-ene, 5-{2-(trichlorosilyl)ethyl}bicyclo[2.2.1]hept-2-ene, 5-{2-(methylphenoxychlorosilyl)ethyl}bicyclo[2.2.1]hept-2-ene, 5-{2-(methylmethoxychlorosilyl)ethyl}bicyclo[2.2.1]hept-2-ene, 5-{3-(dimethylchlorosilyl)propyl}bicyclo[2.2.1]hept-2-ene, 5-{4-(dimethylchlorosilyl)butyl}bicyclo[2.2.1]hept-2-ene, 5-methyl-5-carboxy-bicyclo[2.2.1]hept-2-ene and the like.

Further, specific examples of the unsaturated silane compound represented by the above-mentioned general formula (3) wherein the functional group $Y^1$ is represented by $-SiR^3{}_mZ_{3-m}$ include vinyl trichlorosilane, vinylmethyl dichlorosilane, vinyldimethyl chlorosilane, vinylethyl dichlorosilane, vinyloctyl dichlorosilane, allyl trichlorosilane, allylmethyl dichlorosilane, allyldimethyl chlorosilane, allylhexyl dichlorosilane, butenylmethyl dichlorosilane, 5-hexenyldimethyl chlorosilane, 5-hexenyldimethyl chlorosilane, 7-octenyldimethyl chlorosilane, 5-dimethylchlorosilyl-2-norbornene, 5-{2-(dimethylchlorosilyl)ethyl}-bicyclo[2.2.1]hept-2-ene and the like.

Among these compounds, 5-hexenyldimethyl chlorosilane, 7-octenyldimethyl chlorosilane, 5-dimethylchlorosilyl-2-norbornene, 5-{2-(dimethylchlorosilyl) ethyl}bicyclo-[2.2.1]hept-2-ene and the like are especially preferable. These compounds can be used alone or in admixture of two or more.

The amount of (meth)acryloyl group in the olefin copolymer (A) of the invention is preferably in the range of 0.1 to 500 mmol per 100 g of the olefin copolymer (A), more preferably 0.5 to 200 mmol and especially preferably 1 to 100 mmol. If the amount is less than 0.1 mmol, the resulting copolymer may have reduced crosslinking effects. On the other hand, it is difficult that the olefin copolymer (A) comprises (meth)acryloyl group at an amount exceeding 500 mmol.

The amount of a structural unit (a-1) derived from the compound represented by the above-mentioned general formula (2) or above-mentioned general formula (3) comprised in the olefin copolymer (A) of the invention is preferably in the range of 0.01 to 30 mol %, more preferably 0.05 to 10 mol % and especially preferably 0.1 to 5 mol %, based on all structural units. If the amount is less than 0.01 mol %, the content of (meth)acryloyl group in the resulting copolymer is low, which may lead to reduced crosslinking effects. On the other hand, if the amount exceeds 30 mol %, it becomes difficult to copolymerize with monomers other than olefin and the resulting copolymer may have insufficient elasticity.

Further, the amount of a structural unit (a-2) derived from ethylene comprised in the olefin copolymer (A) of the invention is preferably within the range of 5 to 90 mol %, more preferably 10 to 85 mol % and especially preferably 15 to 80 mol %, based on all structural units. If the amount is less than 5 mol %, mechanical strength and abrasion resistance of the resulting copolymer may be reduced. On the other hand, if the amount exceeds 90 mol %, the resulting copolymer may have insufficient elasticity.

α-olefins having 3 to 10 carbon atoms comprised in the olefin copolymer (A) of the invention include propylene, 1-butene, 1-pentene, 4-methyl-pentene-1,1-hexene, 1-heptene, 1-octene, 1-decene, styrene, p-methyl styrene and the like. Preferably used are propylene, 1-butene, 1-hexene and 1-octene. More preferably, propylene and 1-butene are used.

These compounds can be used alone or in admixture of two or more. Use of α-olefin having 10 or less carbon atoms improves ability of copolymerization of α-olefin with other monomers.

The amount of a structural unit (a-3) derived from α-olefin is preferably in the range of 5 to 60 mol %, more preferably 10 to 50 mol % and especially preferably 15 to 40 mol %, based on all structural units. If the amount is less than 5 mol %, the resulting copolymer may have insufficient elasticity. On the other hand, if the amount exceeds 50 mol %, mechanical strength and abrasion resistance of the resulting copolymer may be reduced.

Unconjugated polyene is comprised in the olefin copolymer (A) of the invention, if necessary.

Specific examples of unconjugated polyene include 1,4-hexadiene, 1,6-hexadiene, 1,5-hexadiene, 5-methyl-1,4-hexadiene, 3,7-dimethyl-1,6-octadiene, 5,7-dimethyl-1,6-octadiene, 3,7-dimethyl-1,7-octadiene, 7-methyl-1,6-octadiene, dihydromyrcene, 4-ethylidene-1,6-octadiene, 7-methyl-4-ethylidene-1,6-octadiene, 7-methyl-4-ethylidene-1,6-nonadiene, 6,7-dimethyl-4-ethylidene-1,6-octadiene, 7-methyl-4-ethylidene, 1,6-decadiene, tetrahydroindene, methyl tetrahydroindene, dicylopentadiene, bicyclo[2.2.1]hepta-2,5-diene, 5-methylene-2-norbornene, 5-ethylidene-2-norbornene, 5-propenyl-2-norbornene, 5-isopropylidene-2-norbornene, 5-cyclohexylidene-2-norbornene, 5-vinyl-2-norbornene and the like.

These compounds can be used alone or in admixture of two or more.

Further, preferably used among the above-mentioned unconjugated polyene are 1,4-hexadiene, dicylopentadiene, 5-ethylidene-2-norbornene and the like.

The amount of a structural unit (a-4) derived from unconjugated polyene comprised in the olefin copolymer (A) of the invention is preferably within the range of 0 to 12 mol %, more preferably 0 to 8 mol % and especially preferably 0 to 5 mol %, based on all structural units. If the amount exceeds 12 mol %, catalytic activity is substantially reduced, which is not good from the viewpoint of cost.

The olefin copolymer (A) of the invention has an intrinsic viscosity [η] in the range of 0.01 to 10 dl/g, preferably 0.05 to 7 dl/g, more preferably 0.1 to 5 dl/g, measured in decalin at a temperature of 135° C. If the intrinsic viscosity [η] is less than 0.01 dl/g, blending of the olefin copolymer (A) with other olefin polymer rubber becomes difficult. On the other hand, if the intrinsic viscosity [η] exceeds 10 dl/g, processability of the copolymer decreases.

Besides, the olefin copolymer (A) of the invention has a polystyrene-reduced weight average molecular weight (Mw) of preferably 1,000 to 3,000,000, more preferably 3,000 to 1,000,000 and especially preferably 5,000 to 700,000 measured in o-dichlorobenzene solvent by gel permeation chromatography at a temperature of 135° C. Polystyrene-reduced number average molecular weight (Mn) is preferably 500 to 1,000,000; more preferably 1,000 to 500,000 and especially preferably 2,000 to 300,000.

The glass transition temperature of the olefin copolymer (A) is preferably −90 to 50° C., more preferably −70 to 10° C. Within the above range, the produced copolymer is able to have sufficient elasticity.

The glass transition temperature of the olefin copolymer (A) is measured by a differential scanning calorimeter (DSC).

In the present invention, the structure of the olefin copolymer (A) having (meth)acryloyl group as a side-chain thereof is confirmed by means of the infra-red absorption spectrum having absorption peak around 1,725 cm$^{-1}$ assigned to carbonyl group, absorption peak around 1,640 cm$^{-1}$ assigned to alkene and the like group. In addition, the structure can be confirmed by means of the nuclear magnetic resonance spectrum ($^1$H-NMR) having the alkene proton peaks at 6.1 ppm and 5.6 ppm.

The olefin copolymer (A) of the invention may be used alone, further, may be used favorably as a blended mixture with conventional olefin copolymer (C) (the conventional ethylene-α-olefin (unconjugated polyene) copolymer) (hereinafter may referred as "olefin copolymer (C)") other than component (A).

If the olefin copolymer (A) of the invention is used as a blend with the conventional olefin copolymer (C), the weight ratio of component (A) to component (C) is usually 1/99 to 99/1, preferably 3/97 to 97/3 and more preferably 5/95 to 95/5.

The above-mentioned olefin copolymer (A) can be produced as follows.

Firstly, either the compound represented by general formula (2) or the compound represented by general formula (3) is copolymerized with ethylene, an α-olefin having 3 to 10 carbon atoms, and if necessary, unconjugated polyene. Then, the compound represented by general formula (1) is added, terminating the copolymerization reaction and reacting with functional groups such as silyl groups and the like contained in the copolymer, resulting in introduction of (meth)acryloyl group into the copolymer.

Bases such as triethylamine, pyridine, N,N-dimethylaniline, N,N,N',N'-tetramethylethylene diamine, N-methyl piperidine, N-methyl pyrrolidine and the like may be used in order to accelerate the reaction. Methanol, ethanol, isopropyl alcohol, n-butanol and the like may also be added if the compound represented by general formula (1) does not react with all functional groups such as silyl groups and the like.

Afterwards, residual unreacted monomers, solvent and the like are removed and the ethylene-α-olefin copolymer having (meth)acryloyl group as a side-chain thereof is obtained.

As for the polymerization, transition metal compounds, preferably containing a compound of a metal selected from the group consisting of Group 4 or Group 5 of the Periodic Table, and organic aluminum compound are used as catalysts.

It is preferred that use is made of the catalyst which gives relatively random monomer sequence in the copolymerization reaction of ethylene and α-olefin (and unconjugated polyene). Specific examples of the catalyst systems are as follows:

(1) a catalyst system comprising vanadium compound soluble in hydrocarbon compound and organic aluminum compound; wherein at least one chlorine atom is contained in the vanadium compound and/or organic aluminum compound.

In addition, oxygen-containing or nitrogen-containing electron donors such as ester, ether, amine, ketone, alkoxysilane of organic acids or inorganic acids may be added to the above-mentioned vanadium compound and organic aluminum compound of this catalyst system.

(2) a catalyst system comprising titanium halide or zirconium halide supported on silica or magnesium chloride and organic aluminum.

As for titanium halides, titanium tetrachloride, titanium tetrabromide, zirconium tetrachloride and the like may be used.

As for organic aluminum compound, trimethyl aluminum, triethyl aluminum, triisobutyl aluminum and methyl alumoxane may be used.

Also, to the above-mentioned compounds of this catalytic system, dioctyl phthalate, tetraalkoxysilane, diphenyldimethoxysilane and the like may further be added.

(3) a catalyst system comprising a transition metal compound containing a metal selected from the group consisting of titanium, zirconium and hafnium, which metal has 1 or 2 groups selected from cyclopentadienyl, indenyl and fluorolenyl, which group has a substituent as a ligand selected from the group consisting of hydrogen, alkyl group and allyl group and an organic aluminum compound containing at least 50 equivalent mole of methyl almoxane (MAO).

(4) a catalyst system comprising a dichloride of bisalkyl-substituted or N-alkyl-substituted salicyl aldoimine with titanium, zirconium or hafnium and methyl almoxane.

The polymerization reaction is preferably conducted in the presence of appropriate solvent or diluent.

As for such solvent or diluent, for example, aliphatic hydrocarbons, alicyclic hydrocarbons, aromatic hydrocarbons and halides thereof, may be used. Specific examples include butane, pentane, hexane, heptane, 2-butene, 2-methyl-2-butene, cyclopentane, methyl cyclopentane, cyclohexane, isooctane, benzene, toluene, xylene, chlorobenzene, dichloromethane, dichloroethane and the like. These solvents or diluents are preferably used after reduction of water to an amount of not more than 20 ppm by distillation or adsorption treatment.

The polymerization reaction is preferably conducted at a temperature of 0 to 150° C., particularly 10 to 100° C.

If necessary, molecular weight adjusters can be used in the polymerization reaction. Specific examples include hydrogen, diethyl zinc, diisobutyl aluminum hydride and the like.

The reactor in which the polymerization reaction takes place can be either a batch type reactor or a continuous type reactor. Tubular reactors, tower-type reactors, tank reactors and the like can be used as a continuous type reactor.

The reaction of α-olefin copolymer (A) with the compound represented by general formula (1) is preferably conducted at a temperature of 0 to 150° C., particularly 10 to 100° C.

The compound represented by general formula (1) may be dissolved or diluted by a solvent or diluent. As for a solvent or diluent, aliphatic hydrocarbons, alicyclic hydrocarbons, aromatic hydrocarbons and halides thereof may be used. Specific examples include butane, pentane, hexane, heptane, 2-butene, 2-methyl-2-butene, cyclopentane, methyl cyclopentane, cyclohexane, isooctane, benzene, toluene, xylene, chlorobenzene, dichloromethane, dichloroethane and the like.

Removal treatment of residual polymerization catalyst and the like, is preferably conducted by passing of the copolymer solution containing the olefin copolymer (A) obtained in the above-mentioned method through an adsorption column filled with silica, alumina, diatom earth and the like, or by washing the copolymer solution after adding a large amount of water, alcohol and the like.

Common antioxidants such as phenolic, phosphoric, sulfuric ones and the like can be added to improve stability of the olefin copolymer (A).

Common compounding agents such as vulcanizing agents, vulcanizing coagents, rubber reinforcing agents, pigments, fillers, softening agents, antiscorching agents, aging inhibitors, processing coagents and the like can be compounded to the olefin copolymer (A) of the invention depending on the use and the required performance.

Crosslinking methods known in the art may be used as the crosslinking method for the olefin copolymer (A) in the invention. Ordinarily, crosslinking by sulfur and/or sulfur compounds, resin crosslinking, quinoid crosslinking, crosslinking by organic peroxides, electron beam irradiation crosslinking, ultraviolet light irradiation crosslinking, radiation crosslinking and the like may be used.

The olefin copolymer (A) of the invention has a high crosslinking rate and has excellent processability, mechanical strength and abrasion resistance; and is excellent as a rubber material used in automobile components, machinery components, electronic components, materials for civil engineering and construction, fuel cell packing and the like.

The vulcanizing agent in the above-mentioned component (B) used in the invention is not particularly restricted. Examples include sulfurs such as powdery sulfur, precipitated sulfur, colloidal sulfur, insoluble sulfur and the like; inorganic vulcanizing agents such as sulfur chloride, selenium, tellurium and the like, sulfur-containing organic compounds such as morpholine disulfide, alkylphenol disulfides, thiuram disulfides, dithiocarbamates and the like. These vulcanizing agents can be used alone or in admixture of two or more.

The compounding amount of (B) vulcanizing agent is usually 0.1 to 10 parts weight, preferably 0.5 to 5 parts weight, per 100 parts weight of rubber component (component (A), or component (A) and component (C)).

Vulcanization accelerators can be used along with the above-mentioned vulcanizing agents.

Examples of these vulcanization accelerators include, for example, aldehyde-ammonia compounds such as hexamethylene tetramine and the like; guanidines such as diphenyl guanidine, di(o-tolyl) guanidine, o-tolyl biguanide and the like; thioureas such as thiocarbanide, di(o-tolyl) thiourea, N,N'-diethyl thiourea, tetramethyl thiourea, trimethyl thiourea, dilauryl thiourea and the like; thiazoles such as mercaptobenzothiazole, dibenzothiazole disulfide, 2-(4-morpholinothio) benzothiazole, 2-(2,4-dinitrophenyl)-mercapto benzothiazole, (N,N'-diethylthiocarbamoylthio) benzothiazole and the like; sulfenic amides such as N-t-butyl-2-benzothiazyl sulfenic amide, N,N'-dicyclohexyl-2-benzothiazyl sulfenicamide, N,N'-diisopropyl-2-benzothiazyl sulfenic amide, N-cyclohexyl-2-benzothiazyl sulfenic amide and the like; thiurams such as tetramethyl thiuram disulfide, tetraethyl thiuramdisulfide, tetra-n-butyl thiuramdisulfide, tetramethyl thiuram monosulfide, di-pentamethylene thiuram tetrasulfide and the like; carbamates such as zinc dimethyl thiocarbamate, zinc diethyl thiocarbamate, zinc di-n-butyl thiocarbamate, zinc ethylphenyl dithiocarbamate, sodium dimethyl dithiocarbamate, copper dimethyl dithiocarbamate, tellurium dimethyl thiocarbamate, iron dimethyl thiocarbamate and the like; xanthates such as zinc butyl thioxanthate and the like. These vulcanization accelerating coagents can be used alone or in admixture of two or more.

The compounding amount of vulcanization accelerator is usually 0.1 to 20 parts weight, preferably 0.2 to 10 parts weight, per 100 parts weight of rubber component (component (A), or component (A) and component (C)).

In addition to the above-mentioned vulcanizing agent and vulcanization accelerators, if necessary, a vulcanization accelerating coagent can be added.

Such vulcanization accelerating coagent includes, for example, metal oxides such as magnesium oxide, zinc white, litharge, red lead, white lead and the like; organic acids and their salts such as stearic acid, oleic acid, zinc stearate and the like. Among them, zinc white and stearic acid are particularly preferred. These vulcanization accelerating coagents can be used alone or in admixture of two or more.

The compounding amount of the vulcanization accelerating coagent is usually 0.5 to 20 parts weight per 100 parts weight of rubber component (component (A), or component (A) and component (C)).

Next, a crosslinking agent in component (B) includes for example, organic peroxides such as 1,1-di-t-butylperoxy-3,3,5-trimethylcyclohexane, di-t-butyl peroxide, dicumyl peroxide, t-butylcumyl peroxide, 2,5-dimethyl-2,5-di(t-butylperoxy)hexane, 1,3-bis(t-butylperoxyisopropyl) benzene and the like.

These crosslinking agents can be used alone or in admixture of two or more.

The compounding amount of the crosslinking agent is usually 0.1 to 15 parts weight, preferably 0.5 to 10 parts weight per 100 parts weight of rubber component (component (A), or component (A) and component (C)).

A crosslinking coagent can be used along with the above-mentioned crosslinking agents.

Such crosslinking coagent includes for example, sulfur and sulfur compounds such as dipentamethylenethiuram tetrasulfide and the like; polyfunctional monomers such as ethylene di(meth)acrylate, polyethylene di(meth)acrylate, trimethylolpropane tri(meth)acrylate, pentaerythritol tri (meth)acrylate, pentaerythritol tetra(meth)acrylate, divinylbenzene, diallyl phthalate, triallyl cyanurate, metaphenylene bismaleimide, toluylene bismaleimide and the like; oxime compounds such as p-quinone oxime, p,p'-benzoyl quinone oxime and the like. These crosslinking coagents can be used alone or in admixture of two or more.

The compounding amount of the crosslinking coagent is usually 0.5 to 20 parts weight per 100 parts weight of rubber component (component (A), or component (A) and component (C)).

Further, with the rubber composition of the invention, a filler or a softening agent can be compounded.

The above filler includes, for example, carbon blacks such as SRF, FEF, HAF, ISAF, SAF, FT, MT and the like, inorganic fillers such as white carbon, fine magnesium silicate powder, calcium carbonate, magnesium carbonate, clay, talc and the like. These fillers can be used alone or in admixture of two or more.

The compounding amount of the filler is usually 10 to 200 parts weight, preferably 10 to 100 parts weight per 100 parts weight of rubber component (component (A), or component (A) and component (C)).

The above softening agent includes, for example, process oils such as aromatic oils, naphthenic oils, paraffin oils and the like; vegetable oils such as coconut oil and the like; synthetic oils such as alkylbenzene oils and the like; which are usually used in rubbers. Among them, process oils are preferable and paraffin oils are particularly preferable. These softening agents can be used alone or in admixture of two or more.

The compounding amount of the softening agent compounded is usually 10 to 130 parts weight, preferably 20 to 100 parts weight per 100 parts weight of rubber component (component (A), or component (A) and component (C)).

The (meth)acryloyl group-modified ethylene-α-olefin copolymer of the invention shows excellent crosslinking efficiency due to the (meth)acryloyl group introduced into the copolymer as a side-chain.

In addition, the rubber composition comprising this (meth)acryloyl group-modified ethylene-α-olefin copolymer has excellent processability, mechanical strength, and abrasion resistance; and is excellent for rubber material used in automobile components, machinery components, electronic components, materials for civil engineering and construction, fuel cell packing and the like.

Next, the liquid curable rubber composition of the invention comprises the above-mentioned (A) (meth)acryloyl group-modified ethylene-α-olefin copolymer, reactive diluent (D), and, if necessary, photopolymerization initiator (E).

Here, it is preferably that the weight average molecular weight (Mw) of the component (A) used in the liquid curable rubber composition is in the range of 500 to 200,000, more preferably 1,000 to 180,000 and particularly preferably 10,000 to 150,000 which is determined by gel permeation chromatography in o-dichlorobenzene at a temperature of 135° C. If the weight average molecular weight is less than 500, the strength of the resulting crosslinked product is insufficient. On the other hand, if the weight average molecular weight exceeds 200,000, the obtained composition is not in liquid state.

The reactive diluent (D) used in the liquid curable rubber composition of the invention has a function of reacting by ultraviolet light or electron beam and curing the liquid curable rubber composition of the invention, while lowering the viscosity of the obtained composition. As for reactive diluent (D), use is made of a monomer having one or more (meth)acryloyl groups or vinyl groups therein. The above monomer includes for example, a monofunctional monomer and a polyfunctional monomer having two or more functional groups.

Above monofunctional monomer includes for example, alicyclic structure containing (meth)acrylates such as isobornyl (meth)acrylate, bornyl (meth)acrylate, tricyclodecanyl (meth)acrylate, dicyclopentanyl (meth)acrylate, dicyclopentenyl (meth)acrylate, cyclohexyl (meth)acylate;

benzyl (meth)acrylate, 4-butylcyclohexyl (meth)acrylate, (meth)acryloylmorpholine, 2-hydroxyethyl (meth)acrylate, 2-hydroxypropyl (meth)acrylate, 2-hydroxybutyl (meth)acrylate, methyl (meth)acrylate, ethyl (meth)acrylate, propyl (meth)acrylate, isopropyl (meth)acrylate, butyl (meth)acrylate, amyl (meth) acrylate, isobutyl (meth)acrylate, t-butyl (meth) acrylate, pentyl (meth)acrylate, isoamyl (meth) acrylate, hexyl (meth)acrylate, heptyl (meth)acrylate, octyl (meth)acrylate, isooctyl (meth)acrylate, 2-ethylhexyl (meth)acrylate, nonyl (meth)acrylate, decyl (meth)acrylate, isodecyl (meth)acrylate, undecyl (meth)acrylate, dodecyl (meth)acrylate, stearyl (meth) acrylate, isostearyl (meth)acrylate, tetrahydrofurfuryl (meth)acrylate, butoxyethyl (meth)acrylate, ethoxydiethylene glycol (meth)acrylate, phenoxyethyl (meth)acrylate, polyethylene glycol mono (meth)acrylate, polypropylene glycol mono (meth) acrylate, methoxyethylene glycol (meth)acrylate, ethoxyethyl (meth)acrylate, methoxypolyethylene glycol (meth)acrylate, methoxypolypropylene glycol (meth)acrylate, diacetone (meth)acrylamide, isobutoxymethyl (meth)acrylamide, N,N-dimethyl (meth) acrylamide, t-octyl (meth)acrylamide, dimethylaminoethyl (meth)acrylate, diethylaminoethyl (meth) acrylate, 7-amino-3,7-dimethyloctyl (meth)acrylate, N,N-diethyl (meth)acrylamide, N,N-dimethylaminopropyl (meth)acrylamide, acryloyl morpholine; polyether backbone containing (meth) acrylates represented by the following formula (4):

$$CH_2=C(R^5)COO(R^6O)_nR^7 \quad (4)$$

wherein $R^5$ represents hydrogen atom or methyl group, $R^6$ represents an alkylene group having 2 to 6 carbon atoms, preferably 2 to 4 carbon atoms; $R^7$ represents hydrogen atom or an alkyl group having 1 to 12 carbon atoms; and "n" is an integer of 0 to 12;

unsaturated monomers having vinyl groups bound to a nitrogen atom, such as N-vinyl pyrrolidone, N-vinyl caprolactam, N-vinyl formamide, N-vinyl carbazole, N-vinyl succinate imide, N-vinyl phthalate imide and the like.

Also, vinyl ethers such as hydroxybutyl vinyl ether, lauryl vinyl ether, cetyl vinyl ether, 2-ethylhexyl vinyl ether and the like.

The above bifunctional monomer includes for example, (meth)acryloyl group-containing monomers such as ethylene glycol di(meth)acrylate, tetraethylene glycol di(meth) acrylate, polyethylene glycol di(meth)acrylate, 1,4-butanediol di(meth)acrylate, 1,6-hexanediol di(meth) acrylate, neopentyl glycol di(meth)acrylate, tris(2-hydroxyethyl) isocyanurate di(meth)acrylate, tricyclodecane dimethanol di(meth)acrylate, di(meth) acrylate of alkylene oxide appended diol of bisphenol A, di(meth)acrylate of alkylene oxide appended diol of hydrogenated bisphenol A, epoxy (meth)acrylate produced by addition of (meth)acrylate group to diglycidyl ether of bisphenol A and the like; vinyl group-containing monomers such as triethylene glycol divinyl ether, divinylbenzene and the like.

The above polyfunctional monomer having 3 or more functional groups includes for example, trimethylolpropane tri(meth)acrylate, ethoxylated trimethylolpropane tri(meth) acrylate, propoxylated trimethylolpropane tri(meth)acrylate, pentaerythritol tri(meth)acrylate, pentaerythritol tri(meth) acrylate, pentaerythritol tetra(meth)acrylate, dipentaerythritol hexa(meth)acrylate, ditrimethylol propane tetra(meth) acrylate, tris(2-(meth)acryloxyethyl) isocyanurate and the like.

These reactive diluents (D), if necessary, can be used alone or in admixture of two or more.

When the liquid curable rubber composition of the invention is cured by light (for example, ultraviolet light), photopolymerization initiator (E) is used for the rubber composition of the invention.

Photopolymerization initiator (E) includes for example, 1-hydroxycyclohexyl phenyl ketone, 2,2-dimethoxy-1,2-diphenylethane-1-one, xanthone, fluorenone, benzaldehyde, fluorene, anthraquinone, triphenylamine, carbazole, 3-methylacetophenone, 4-chlorobenzophenone, 4,4'-dimethoxybenzophenone, 4,4'-diaminobenzophenone, Michler's ketone, benzoin propyl ether, benzoin ethyl ether, benzyl dimethyl ketal, 1-(4-isopropylphenyl)-2-hydroxy-2-methyl propane-1-one, 2-hydroxy-2-methyl-1-phenylpropane-1-one, thioxanthone, diethylthioxanthone, 2-isopropylthioxanthone, 2-chlorothioxanthone, 2-methyl-1-(4-(methylthio)phenyl)-2-morpholino-propane-1-one, 2,4, 6-trimethylbenzoyldiphenylphosphine oxide, bis-(2,6-dimethoxybenzoyl)-2,4,4-trimethylpentylphosphine oxide and the like.

The liquid curable rubber composition of the invention can be produced by blending the above components (A) and (D) or components (A), (D) and (E) by conventional methods.

As for the composition ratio of each component in the liquid curable rubber composition of the invention, the weight ratio of component (E) is in a range of 0.01 to 10 parts, preferably 0.1 to 7 parts, based on total (100 parts) of component (A) and component (D), wherein the weight ratio of component (A) is 20 to 100 parts, preferably 30 to 100 parts and the weight ratio of component (D) is 80 to 0 part, preferably 70 to 0 part. If the weight ratio of component (A) is less than 20 parts, based on total of components (A) and (D), the rubber elasticity of the resulting crosslinked product is insufficient. Besides, in the case of electron beam crosslinking (curing), the liquid curable rubber composition of the invention does not have to contain component (E). If the ratio of component (E) is less than 0.01 part, based on total (100 parts) of component (A) and component (D), light (ultraviolet light or electron beam) curing is insufficient. On the other hand, if it exceeds 10 parts, curing properties, mechanical properties and the like of the crosslinked product are insufficient.

Further, the liquid curable rubber composition of the invention may include non-polymerizable additives other than the above reactive diluent (D), photopolymerization initiator (E), for example, antioxidants, ultraviolet light absorbents, light stabilizers, silane coupling agents and the like.

Here, antioxidants include for example, Irganox 1010, 1035, 1076, 1222 (manufactured by Ciba Specialty Chemicals K.K.), Antigene P, 3C, FR, GA-80 (manufactured by Sumitomo Chemical Company, Limited) and the like.

Ultraviolet absorbents include for example, Tinuvin P, 234, 320, 326, 327, 328, 329, 213 (manufactured by Ciba Specialty Chemicals K.K.), Seesorb 102, 103, 501, 202, 712, 704 (manufactured by SHIPRO KASEI KAISHA, LTD.) and the like.

Light stabilizers include for example, Tinuvin 292, 144, 622LD (manufactured by Ciba Specialty Chemicals K.K.), SANOL-LS770 (manufactured by SANKYO CO, LTD), Sumisorb TM-061 (manufactured by Sumitomo Chemical Company, Limited) and the like.

Silane coupling agents include for example, γ-aminopropyl triethoxysilane, γ-mercaptopropyltrimethoxysilane, γ-methacryloxypropyltrimethoxysilane; commercial products such as SH6062, 6030 (manufactured by Dow Corning Toray Silicone Co., Ltd.), KBE903, 603, 403 (manufactured by SHIN-ETSU CHEMICAL Co, Ltd.) and the like.

In addition, the liquid curable rubber composition of the invention can include a softening agent within a range of not inhibiting curing properties. The above softening agent includes, for example, process oils such as aromatic oils, naphthenic oils, paraffin oils and the like; vegetable oils such as coconut oil and the like; synthetic oils such as alkylbenzene oils and the like; which are usually used in rubbers. Among them, process oils are preferable and paraffin oils are particularly preferable. These softening agents can be used alone or in admixture of two or more.

Additionally, with the liquid curable rubber composition of the invention, can be compounded within a range of not adversely affecting curing properties, such as inorganic fillers, organic fillers, coloring pigments, dyes, dispersion coagents, lubricants, antistatic agents, leveling agents, sensitizers, amines and organic solvents, other than the above.

In the case of electron beam curing of the liquid curable rubber composition comprising (A) (meth)acryloyl group-modified ethylene-α-olefin copolymer, a vulcanization accelerating coagent, a crosslinking coagent and a filler other than the above-mentioned reactive diluent (D) and softening agents can be compounded.

The vulcanization accelerating coagent includes, for example, metal oxides such as magnesium oxide, zinc white, litharge, red lead, white lead and the like; organic acids and their salts such as stearic acid, oleic acid, zinc stearate and the like. Among them, zinc white and stearic acid are particularly preferred. These vulcanization accelerating coagents can be used alone or in admixture of two or more.

The crosslinking coagent includes for example, sulfur and sulfur compounds such as dipentamethylenethiuram tetrasulfide and the like; polyfunctional monomers such as diallyl phthalate, triallyl cyanurate, metaphenylene bismaleimide, toluylene bismaleimide and the like; oxime compounds such as p-quinone oxime, p,p'-benzoyl quinone oxime and the like; etc. These crosslinking coagents can be used alone or in admixture of two or more.

The compounding amount of the crosslinking coagent is usually 0.5 to 20 parts weight per 100 parts weight of rubber component (component (A), or component (A) and other rubber component used, if necessary).

The above filler includes, for example, carbon blacks such as SRF, FEF, HAF, ISAF, SAF, FT, MT and the like, inorganic fillers such as white carbon, fine magnesium silicate powder, calcium carbonate, magnesium carbonate, clay, talc and the like; etc. These fillers can be used alone or in admixture of two or more.

The conditions of electron beam irradiation for the above electron beam crosslinking (curing) are determined depending on mechanical properties of the obtained crosslinked product, economical considerations and the like. For example, 10 to 1,000 kGy can be adopted.

In the case that the liquid curable rubber composition of the invention is crosslinked (cured) by ultraviolet light, the conditions of ultraviolet light irradiation are determined depending on the mechanical properties of the obtained crosslinked product, economical considerations and the like. For example, 100 to 10,000 mJ/cm$^2$ can be adopted.

By virtue of (meth)acryloyl group introduced as a side-chain of the olefin copolymer (A), the liquid curable rubber composition comprising the (meth)acryloyl group-modified ethylene-α-olefin copolymer of the invention shows excellent crosslinking efficiency. The liquid curable rubber composition of the invention can be processed by conventional methods. By various processing methods, for example, casting method, screen printing method, coater method, spin coating method and the like, the composition may be processed into film, packing, gaskets, sealing materials and the like. Then, it can be made into crosslinked molded body by means of the above crosslinking using ultraviolet light or electron beam irradiation.

There is no particular restriction on the thickness of the molded body (shaped product). Besides, in the case of ultraviolet light curing, the thickness is preferably 1 cm to 1 μm, particularly preferably 1 mm to 5 μm, while in the case of electron beam curing, it is preferably 10 cm to 1 μm, particularly preferably, 2 cm to 5 μm.

The liquid curable rubber composition of the invention comprises a modified ethylene-α-olefin copolymer having improved crosslinking efficiency due to introduction of a specific functional group ((meth)acryloyl group) contained therein. Therefore, the liquid curable rubber composition of the invention has excellent processability such as casting properties, rubber elasticity such as mechanical strength and compression set property and the like; and is excellent for use in automobile components, machinery components, electronic parts, batteries, fuel cells, capacitors, ultracapacitors, packing materials for civil engineering and construction, gaskets, rubber material such as sealing material, semiconductor sealant, mounting material, liquid crystal display material, and various negative photo-resists.

Examples are shown below to explain this invention in more detail. However, this invention should not be construed to be limited to the Examples.

EXAMPLE 1

In a nitrogen-purged 2-liter separable flask, 1,000 mL of toluene was charged, 5 mmol of 5-{2-(dimethylchlorosilyl)ethyl}bicyclo[2.2.1]hept-2-ene and 2 mL of 5-ethylidene-2-norbornene were added, and a gas mixture of ethylene (feed amount: 5 L/min)/propylene (feed amount: 5 L/min)/hydrogen (feed amount: 3.5 L/min) was fed continuously. Into the flask, 6.2 mL of a 0.81 mol/L hexane solution of $Al_2(C_2H_5)_3Cl_3$ (5 mmol of $Al_2(C_2H_5)_3Cl_3$) was added as a polymerization catalyst. Next, 5 mL of a 0.10 mol/L hexane solution of $VCl_4$ (0.5 mmol of $VCl_4$) was added and the copolymerization reaction of ethylene, propylene, 5-{2-(dimethylchlorosilyl)ethyl}bicyclo[2.2.1]-hept-2-ene and 5-ethylidene-2-norbornene was conducted under condition of 25° C., 10 minutes. Subsequently, 25 mmol of triethylamine and 25 mmol of 2-hydroxyethyl methacrylate were added and stirred for 30 minutes, followed by the addition of 10 mL of n-butanol and stirring for 10 minutes. After 500 mL of water was added to the copolymer solution and stirred for 10 minutes, only the copolymer solution (organic layer) was recovered. After washing the copolymer solution with 500 mL of water for two times, the copolymer solution was poured into a large amount of methanol to precipitate the copolymer, then 20 g of modified olefin copolymer (A1) was obtained by drying treatment using a heated open mill.

Introduction of the (meth)acryloyl group into modified olefin copolymer (A1) was confirmed by a peak around 1,640 cm$^{-1}$ detected by the analysis of infra-red absorption spectrum method. Further, the analysis of $^1$H-NMR measurement method showed that, in the copolymer, the amount of the structural unit derived from ethylene was 71.5 mol %, the amount of the structural unit derived from propylene was 26.3 mol %, the amount of (meth)acryloyl group was 13.1 (mmol/100 g polymer), and the amount of the structural unit derived from 5-ethylidene-2-norbornene was 1.8 mol % determined by iodine value titration. In addition, the intrinsic viscosity [η] was 1.3 measured in decalin at a temperature of 135° C. FIG. 1 shows the IR chart of modified olefin copolymer (A1) obtained in Example 1.

EXAMPLE 2

In the same manner as in Example 1, with exception that 10 mmol of 5-{2-(dimethylchlorosilyl)ethyl}bicyclo[2.2.1]hept-2-ene, 30 mmol of triethylamine and 30 mmol of 2-hydroxyethyl methacrylate were used, 20 g of modified olefin copolymer (A2) was obtained.

Introduction of the (meth)acryloyl group into modified olefin copolymer (A2) was confirmed by a peak around 1,640 cm$^{-1}$ detected by the analysis of infra-red absorption spectrum method. Further, the analysis of $^1$H-NMR measurement method showed that, in the copolymer, the amount of the structural unit derived from ethylene was 70.0 mol %, the amount of the structural unit derived from propylene was 27.5 mol %, the amount of (meth)acryloyl group was 24.1 (mmol/100 g polymer), and the amount of the structural unit derived from 5-ethylidene-2-norbornene was 1.7 mol % determined by iodine value titration. In addition, the intrinsic viscosity [η] was 1.4 measured in decalin at a temperature of 135° C.

EXAMPLE 3

In the same manner as in Example 1, with exception that hexane was used in place of toluene, feed amount of hydrogen was 0.5 L/min, 5-ethylidene-2-norbornene was not used, 100 mmol of triethylamine and 100 mmol of 2-hydroxyethyl methacrylate was used, 30 g of modified olefin copolymer (A3) was obtained.

Introduction of the (meth)acryloyl group into modified olefin copolymer (A3) was confirmed by a peak around 1,640 cm$^{-1}$ detected by the analysis of infra-red absorption spectrum method. Further, the analysis of $^1$H-NMR measurement method showed that, in the copolymer, the amount of the structural unit derived from ethylene was 68.1 mol %, the amount of the structural unit derived from propylene was 31.5 mol % and the amount of (meth)acryloyl group was 10.8 (mmol/100 g polymer). In addition, the intrinsic viscosity [η] was 2.3 measured in decalin at a temperature of 135° C.

EXAMPLE 4

In a nitrogen-purged 3-liter separable flask, charged were 2,000 mL of hexane and 70 mL of a 0.5 mol/L hexane solution of 5-methyl-5-carboxy-bicyclo[2.2.1]hept-2-ene (35 mmol of 5-methyl-5-carboxy-bicyclo[2.2.1]hept-2-ene). While stirring this system, 42 mmol of Al(iso-Bu)$_3$ was added and reacted as masking treatment of the carboxyl group of 5-methyl-5-carboxy-bicyclo[2.2.1]hept-2-ene.

Subsequently, 2 mL of 5-ethylidene-2-norbornene was added to this system, and a gas mixture of ethylene (feed amount: 5 L/min)/propylene (feed amount: 5 L/min)/hydrogen (feed amount: 0.5 L/min) was fed continuously. Into the flask, 104 mL of a 0.81 mol/L hexane solution of Al$_2$(C$_2$H$_5$)$_3$Cl$_3$ (84 mmol of Al$_2$(C$_2$H$_5$)$_3$Cl$_3$) was added as a polymerization catalyst. Next, 24 mL of a 0.10 mol/L hexane solution of VCl$_4$ (2.4 mmol of VCl$_4$) was added, and the copolymerization reaction of ethylene, propylene, 5-methyl-5-carboxy-bicyclo[2.2.1]hept-2-ene and 5-ethylidene-2-norbornene was conducted under condition of 5° C., 10 minutes.

Demasking treatment was conducted by adding butanol solution containing 630 mmol of lactic acid to the obtained copolymer solution and stirring for 10 minutes.

Next, after adding 1 L of water to the copolymer solution and stirring for 10 minutes, only the copolymer solution (organic layer) was recovered. After washing the copolymer solution 3 times with 1 L of water, residual lactic acid and the like were removed. Subsequently, solvent removal treatment was conducted by blowing of water vapor into the copolymer solution. Then, solids were separated from the residual slurry, and 30 g of olefin copolymer (X4) was obtained by drying treatment using a heated open mill.

5 g of this olefin copolymer (X4) was dissolved in 25 mL of toluene, and after adding 2 g of glycidyl methacrylate and 2.6 g of triphenyl phosphine, the reaction solution was refluxed for 5 hours. After filtering the resulting solution with a 80 mesh wire mesh filter, the filtrate was poured into 500 mL of methanol to precipitate polymers, and 4.6 g of modified olefin copolymer (A4) was obtained by drying treatment using a heated open mill.

Introduction of the (meth)acryloyl group into modified olefin copolymer (A4) was confirmed by a peak around 1,640 cm$^{-1}$ detected by the analysis of infra-red absorption spectrum method. Further, the analysis of $^1$H-NMR measurement method showed that, in the copolymer, the amount of the structural unit derived from ethylene was 72.7 mol %, the structural unit derived from propylene was 25.3 mol %, the amount of (meth)acryloyl group was 17.6 (mmol/100 g polymer), and the amount of the structural unit derived from 5-ethylidene-2-norbornene was 1.4 mol % determined by iodine value titration. In addition, the intrinsic viscosity [η] was 1.2 measured in decalin at a temperature of 135° C.

EXAMPLE 5

In the same manner as in Example 4 with exception of no use of 5-ethylidene-2-norbornene, 33 g of olefin copolymer (X5) was obtained. Using 5 g of this olefin copolymer (X5), (meth)acryloyl group introduction reaction was conducted in the same manner as in Example 1 and 4.5 g of modified olefin copolymer (A5) was obtained.

Introduction of the (meth)acryloyl group into modified olefin copolymer (AS) was confirmed by a peak around 1,640 cm$^{-1}$ detected by the analysis of infra-red absorption spectrum method. Further, the analysis of $^1$H-NMR measurement method showed that, in the copolymer, the amount of the structural unit derived from ethylene was 69.7 mol %, the amount of the structural unit derived from propylene was 29.7 mol %, and the amount of (meth)acryloyl group was 17.3 (mmol/100 g polymer). In addition, the intrinsic viscosity [η] was 1.4 measured in decalin at a temperature of 135° C.

EXAMPLE 6

5 g of the olefin copolymer (X5) obtained in Example 5 was dissolved in 30 mL of toluene, and after adding 2 g of 2-hydroxyethyl methacrylate and 0.4 g of boron trifluoride diethyl ether complex, the reaction solution was refluxed for 15 hours. After filtering the resulting solution with a 80 mesh wire mesh filter, the filtrate was poured into 500 mL of methanol to precipitate polymers, and 4.6 g of modified olefin copolymer (A6) was obtained by drying treatment using a heated open mill.

Introduction of the (meth)acryloyl group into modified olefin copolymer (A6) was confirmed by a peak around 1,640 cm$^{-1}$ detected by the analysis of infra-red absorption spectrum method. Further, the analysis of $^1$H-NMR measurement method showed that, in the copolymer, the amount of the structural unit derived from ethylene was 69.5 mol %, the structural unit derived from propylene was 29.9 mol %, and the amount of (meth)acryloyl group was 17.3 (mmol/100 g polymer). In addition, the intrinsic viscosity [η] was 1.4 measured in decalin at a temperature of 135° C.

COMPARATIVE EXAMPLE 1

In the same manner as in Example 1 with exception of no use of 5-{2-(dimethylchlorosilyl) ethyl}bicyclo[2.2.1]-hept-2-ene, triethylamine and 2-hydroxyethyl methacrylate, 20 g of olefin copolymer (B1) was obtained.

By the analysis of this olefin copolymer (B1) by means of infra-red absorption spectrum method, a peak around 1,640 cm⁻¹ did not observed. Further, analysis by ¹H-NMR measurement method showed that, in the copolymer, the amount of the structural unit derived from ethylene was 71.5 mol %, the amount of the structural unit derived from propylene was 27.2 mol %, and the amount of the structural unit derived from 5-ethylidene-2-norbornene was 1.3 mol % determined by iodine value titration. In addition, the intrinsic viscosity [η] was 1.2 measured in decalin at a temperature of 135° C.
(Preparation of Rubber Composition)

EXAMPLE 7

70 g of modified copolymer (A4) obtained in Example 4, 3.5 g of zinc oxide and 0.7 g of stearic acid were kneaded together for 5 minutes with a 6-inch open mill kept at 50° C. To the obtained kneaded mixture, 1.4 g of organic peroxide (1,3-bis(t-butylperoxyisopropyl)benzene) was added, and the mixture was kneaded for 5 minutes with a 6-inch open mill kept at 50° C. resulting a rubber composition.

EXAMPLE 8

In the same manner as in Example 7, with exception that modified copolymer (A5) obtained in Example 5 was used in place of modified copolymer (A4), a rubber composition was obtained.

EXAMPLE 9

In the same manner as in Example 7, with exception that modified copolymer (A1) obtained in Example 1 was used in place of modified copolymer (A4), a rubber composition was obtained.

EXAMPLE 10

In the same manner as in Example 7, with exception that modified copolymer (A2) obtained in Example 2 was used in place of modified copolymer (A4), a rubber composition was obtained.

COMPARATIVE EXAMPLE 2

In the same manner as in Example 7, with exception that copolymer (B1) obtained in Comparative Example 1 was used in place of modified copolymer (A4) and that 0.7 g of trimethylol propane trimethacrylate was added along with 1.4 g of organic peroxide (1,3-bis(t-butylperoxyisopropyl) benzene), a rubber composition was obtained.

COMPARATIVE EXAMPLE 3

In the same manner as in Comparative Example 2, with exception that 2.8 g of organic peroxide (1,3-bis(t-butylperoxyisopropyl)benzene) was used, a rubber composition was obtained.
(Evaluation of the Rubber Composiiton)

Each rubber composition obtained in Examples 7 to 10 and Comparative Example 2 was subjected to a hot press heated to 160° C. under the press pressure of 150 kgf/cm² for 30 minutes to prepare a crosslinked sheet. Besides, the rubber composition obtained in Comparative Example 3 was subjected to a hot press heated to 160° C. under the press pressure of 150 kgf/cm² for 90 minutes to prepare a crosslinked sheet. These crosslinked sheets were subjected to the following evaluation as test samples. Results are shown in Table 1.

(1) Vulcanization Characteristics

Vulcanization Characteristics of a rubber composition was determined by using Curelastometer Model V traded by JSR CORPORATION. The time ($t_{90}$) required to reach 90% of the difference between torque maximum and torque minimum determined from vulcanization curve under the condition of 160° C., 40 minutes was defined as $t_{90}$. The time ($t_{10}$) required to reach 10% of the difference was defined as $t_{10}$. Then, the difference; t'c(d80)t'c(d80)=$t_{90}$-$t_{10}$ was determined. Smaller values represent higher crosslinking rates. In addition, torque maximum MH was also determined from vulcanization curve.

(2) Network Chain Concentration 1 g of test sample was immersed in 50 mL of toluene for 72 hours at room temperature, and the degree of swelling of the test sample was measured. Measurement of network chain concentration was calculated using the following Flory-Rehner expression:

ve=-1/V{[ln(1-vr)+vr+$\mu$·vr²]/[vr^{1/3}-2·vr/f]} ve:Network chain concentration

V: Solvent molecule volume (molecular weight/density) (In the case of toluene; 92.14/0.868=105)

vr: Rubber volume ratio in the swelled sample

Here, vr:(Actual rubber volume in vulcanized rubber weight before swelling)/(Actual rubber volume in vulcanized rubber weight before swelling+solvent volume absorbed in swelled rubber)

$\mu$: Interaction constant of solvent (in the case of toluene; 0.49)

f: Number of functional groups (f=4)

(3) Tensile Test

Tensile strength $T_B$ (MPa), elongation at break $E_B$ (%), and 100% modulus were measured according to JIS K6301.

(4) Hardness Test

Spring hardness (JIS-A hardness) was measured according to JIS K6301 (by using Durometer).

(5) Compression Set Test

Compression set property was measured according to JIS K6301 under the condition of 150° C., 70 hours.

TABLE 1

| | Example | | | | Comparative Example | |
|---|---|---|---|---|---|---|
| | 7 | 8 | 9 | 10 | 2 | 3 |
| Vulcanization characteristics | | | | | | |
| t'c(d80) (min) | 12.9 | 5.0 | 19.9 | 13.9 | 27.5 | 27.7 |
| MH (dN · m) | 9.86 | 8.98 | 9.02 | 16.04 | 3.21 | 5.38 |
| Network chain concentration ve (10⁻⁶ mol/cc) | 189 | 151 | 145 | 348 | 26.5 | 70.5 |
| Physical properties of vulcanizate | | | | | | |
| $T_B$ (MPa) | 1.5 | 1.3 | 2.6 | 2.1 | 2.8 | 2.9 |
| $E_B$ (%) | 260 | 300 | 360 | 160 | 720 | 340 |
| 100% modulus | 0.8 | 0.9 | 0.9 | 1.5 | 0.5 | 0.7 |
| Hardness (Duro A) | 49 | 49 | 50 | 54 | 44 | 50 |
| Compression set 150° C., 70 hrs (%) | 25 | 28 | 52 | 34 | 70 | 55 |

EXAMPLE 11

In a nitrogen-purged 3-liter separable flask, 2,000 mL of hexane was charged, 20 mmol of 5-{2-(dimethylchlorosilyl)ethyl}bicyclo[2.2.1]hept-2-ene and 5.5 ml of 5-ethylidene-2-norbornene were added, and a gas mixture of ethylene (feed amount: 5 L/min)/propylene (feed amount: 4 L/min)/hydrogen (feed amount: 5 L/min) was fed continuously. Into the flask, 37.0 mL of a 0.81 mol/L hexane solution of Al₂(C₂H₅)₃Cl₃ (30 mmol of Al₂(C₂H₅)₃Cl₃) was added as a polymerization catalyst. Next, 7.5 mL of a 0.40 mol/L hexane solution of $VCl_4$ (3.0 mmol of $VCl_4$) was added, and the copolymerization reaction of ethylene, propylene, 5-{2-(dimethylchlorosilyl) ethyl}bicyclo-[2.2.1]hept-2-ene and 5-ethylidene-2-norbornene was conducted under condition of 25° C., 10 minutes. Subsequently, 300 mmol of triethylamine and 300 of mmol 2-hydroxyethyl methacrylate were added and stirred for 1 hour, followed by the addition of 10 mL of n-butanol and stirring for 10 minutes. After 1,000 mL of water was added to the copolymer solution and stirred for 10 minutes, only the copolymer solution (organic layer) was recovered. After washing the copolymer solution with 1,000 mL of water for two times, the copolymer solution was poured into a large amount of methanol to precipitate the copolymer, and 42.3 g of modified olefin copolymer (A7) was obtained by drying treatment using a heated open mill.

Introduction of the (meth)acryloyl group into modified olefin copolymer (A7) was confirmed by a peak around 1,640 $cm^{-1}$ detected by the analysis of infra-red absorption spectrum method. Further, the analysis of $^1H$-NMR measurement method showed that, in the copolymer, the amount of the structural unit derived from ethylene was 65.8 mol %, the amount of the structural unit derived from propylene was 30.9 mol %, the amount of (meth)acryloyl group was 6.6 (equivalent weight/molecule), and the amount of the structural unit derived from 5-ethylidene-2-norbornene was 2.3 mol % determined by iodine value titration. Further, the molecular weight (Mw) was 53,000 determined in o-dichlorobenzene (ODCB) at 135° C. Furthermore, the intrinsic viscosity [η] was 0.9 measured in decalin at a temperature of 135° C.

EXAMPLE 12
(Preparation of Olefin Copolymer (A8))

In a nitrogen-purged 3-liter separable flask, 2,000 mL of hexane was charged, 20 mmol of 5-{2-(dimethylchlorosilyl) ethyl}bicyclo[2.2.1]hept-2-ene and 4.0 ml of 5-ethylidene-2-norbornene were added, and a gas mixture of ethylene (feed amount: 2.5 L/min)/propylene (feed amount: 2 L/min)/ hydrogen (feed amount: 8 L/min) was fed continuously. Into the flask, 61.7 mL of a 0.81 mol/L hexane solution of $Al_2(C_2H_5)_3Cl_3$ (50 mmol of $Al_2(C_2H_5)_3Cl_3$) was added as a polymerization catalyst. Next, 12.5 mL of a 0.40 mol/L hexane solution of $VCl_4$ (5.0 mmol of $VCl_4$) was added, and the copolymerization reaction of ethylene, propylene, 5-{2-(dimethylchlorosilyl)ethyl}bicyclo[2.2.1]-hept-2-ene and 5-ethylidene-2-norbornene was conducted under condition of 25° C., 10 minutes. Subsequently, 350 mmol of triethylamine and 350 mmol of 2-hydroxyethyl methacrylate were added and stirred for 1 hour, followed by the addition of 10 mL of n-butanol and stirring for 10 minutes. After 1,000 mL of water was added to the copolymer solution and stirred for 10 minutes, only the copolymer solution (organic layer) was recovered. After washing the copolymer solution with 1,000 mL of water for two times, the copolymer solution was poured into a large amount of methanol to precipitate the copolymer, and 18.0 g of modified olefin copolymer (A8) was obtained by drying treatment using a heated open mill.

In modified olefin copolymer (A8), the amount of the structural unit derived from ethylene was 64.8 mol %, the amount of the structural unit derived from propylene was 29.5 mol %, the amount of (meth)acryloyl group was 4.6 (equivalent weight/molecule), and the amount of the structural unit derived from 5-ethylidene-2-norbornene was 3.4 mol %. Further, the molecular weight (Mw) was 17,000 determined in o-dichlorobenzene (ODCB) at 135° C. Furthermore, the intrinsic viscosity [η] was 0.4 measured in decalin at a temperature of 135° C.

EXAMPLE 13
(Preparation of Modified Olefin Copolymer (A9))

In a nitrogen-purged 3-liter separable flask, 2,000 mL of hexane was charged, 30 mmol of 5-{2-(dimethylchlorosilyl) ethyl}bicyclo[2.2.1]hept-2-ene and 5.5 ml of 5-ethylidene-2-norbornene were added, and a gas mixture of ethylene (feed amount: 5 L/min)/propylene (feed amount: 4 L/min)/ hydrogen (feed amount: 5.5 L/min) was fed continuously. Into the flask, 37.0 mL of a 0.81 mol/L hexane solution of $Al_2(C_2H_5)_3Cl_3$ (30 mmol of $Al_2(C_2H_5)_3Cl_3$) was added as a polymerization catalyst. Next, 7.5 mL of a 0.40 mol/L hexane solution of $VCl_4$ (3.0 mmol of $VCl_4$) was added, and the copolymerization reaction of ethylene, propylene, 5-{2-(dimethylchlorosilyl)ethyl}bicyclo[2.2.1]-hept-2-ene and 5-ethylidene-2-norbornene was conducted under condition of 25° C., 10 minutes. Subsequently, 400 mmol of triethylamine and 400 mmol of 2-hydroxyethyl methacrylate were added and stirred for 1 hour, followed by the addition of 10 mL of n-butanol and stirring for 10 minutes. After 1,000 mL of water was added to the copolymer solution and stirred for 10 minutes, only the copolymer solution (organic layer) was recovered. After washing the copolymer solution with 1,000 mL of water for two times, the copolymer solution was poured into a large amount of methanol to precipitate the copolymer, and 48.5 g of modified olefin copolymer (A9) was obtained by drying treatment using a heated open mill.

In modified olefin copolymer (A9), the amount of the structural unit derived from ethylene was 69.0 mol %, the amount of the structural unit derived from propylene was 27.4 mol %, the amount of (meth)acryloyl group was 11.7 (equivalent weight/molecule), and the amount of the structural unit derived from 5-ethylidene-2-norbornene was 2.0 mol %. Further, the molecular weight (Mw) was 57,000 determined in o-dichlorobenzene (ODCB) at 135° C. Furthermore, the intrinsic viscosity [η] was 0.9 measured in decalin at a temperature of 135° C.

EXAMPLE 14
(Preparation of Modified Olefin Copolymer (A10))

In a nitrogen-purged 3-liter separable flask, 2,000 mL of hexane was charged, 40 mmol of 5-{2-(dimethylchlorosilyl) ethyl}bicyclo[2.2.1]hept-2-ene and 5.5 ml of 5-ethylidene-2-norbornene were added, and a gas mixture of ethylene (feed amount: 5 L/min)/propylene (feed amount: 4.5 L/min)/ hydrogen (feed amount: 5.5 L/min) was fed continuously. Into the flask, 37.0 mL of a 0.81 mol/L hexane solution of $Al_2(C_2H_5)_3Cl_3$ (30 mmol of $Al_2(C_2H_5)_3Cl_3$) was added as a polymerization catalyst. Next, 7.5 mL of a 0.40 mol/L hexane solution of $VCl_4$ (3.0 mmol of $VCl_4$) was added, and the copolymerization reaction of ethylene, propylene, 5-{2-(dimethylchlorosilyl)ethyl}bicyclo[2.2.1]-hept-2-ene and 5-ethylidene-2-norbornene was conducted under condition of 25° C., 10 minutes. Subsequently, 450 mmol of triethylamine and 450 mmol of 2-hydroxyethyl methacrylate were added and stirred for 1 hour, followed by the addition of 10 mL of n-butanol and stirring for 10 minutes. After 1,000 mL of water was added to the copolymer solution and stirred for 10 minutes, only the copolymer solution (organic layer) was recovered. After washing the copolymer solution with 1,000 mL of water for two times, the copolymer solution was poured into a large amount of methanol to precipitate the copolymer, and 36.1 g of modified olefin copolymer (A10) was obtained by drying treatment using a heated open mill.

In modified olefin copolymer (A10), the amount of the structural unit derived from ethylene was 69.0 mol %, the amount of the structural unit derived from propylene was 26.3 mol %, the amount of (meth)acryloyl group was 20.1 (equivalent weight/molecule), and the amount of the structural unit derived from 5-ethylidene-2-norbornene was 2.2 mol %. Further, the molecular weight (Mw) was 66,000 determined in o-dichlorobenzene (ODCB) at 135° C. Furthermore, the intrinsic viscosity [η] was 1.0 measured in decalin at a temperature of 135° C.

EXAMPLE 15
(Preparation of Modified Olefin Copolymer (A11))

In a nitrogen-purged 3-liter separable flask, 2,000 mL of hexane was charged, 20 mmol of 5-{2-(dimethylchlorosilyl)ethyl}bicyclo[2.2.1]hept-2-ene and 5.5 ml of 5-ethylidene-2-norbornene were added, and a gas mixture of ethylene (feed amount: 5 L/min)/propylene (feed amount: 4 L/min)/hydrogen (feed amount: 1 L/min) was fed continuously. Into the flask, 37.0 mL of a 0.81 mol/L hexane solution of $Al_2(C_2H_5)_3Cl_3$ (30 mmol of $Al_2(C_2H_5)_3Cl_3$) was added as a polymerization catalyst. Next, 7.5 mL of a 0.40 mol/L hexane solution of $VCl_4$ (3.0 mmol of $VCl_4$) was added, and the copolymerization reaction of ethylene, propylene, 5-{2-(dimethylchlorosilyl)ethyl}bicyclo-[2.2.1]hept-2-ene and 5-ethylidene-2-norbornene was conducted under condition of 25° C., 10 minutes. Subsequently, 300 mmol of triethylamine and 300 mmol of 2-hydroxyethyl methacrylate were added and stirred for 1 hour, followed by the addition of 10 mL of n-butanol and stirring for 10 minutes. After 1,000 mL of water was added to the copolymer solution and stirred for 10 minutes, only the copolymer solution (organic layer) was recovered. After washing the copolymer solution with 1,000 mL of water for two times, the copolymer solution was poured into a large amount of methanol to precipitate the copolymer, and 59.7 g of modified olefin copolymer (A11) was obtained by drying treatment using a heated open mill.

In modified olefin copolymer (A11), the amount of the structural unit derived from ethylene was 67.5 mol %, the amount of the structural unit derived from propylene was 29.4 mol %, the amount of (meth)acryloyl group was 12.1 (equivalent weight/molecule), and the amount of the structural unit derived from 5-ethylidene-2-norbornene was 2.3 mol %. Further, the molecular weight (Mw) was 129,000 determined in o-dichlorobenzene (ODCB) at 135° C. Furthermore, the intrinsic viscosity [η] was 1.4 measured in decalin at a temperature of 135° C.

Reference Example 1
(Preparation of Modified Olefin Copolymer (CA1))

In a nitrogen-purged 3-liter separable flask, 2,000 mL of hexane was charged, 1.5 ml of 5-ethylidene-2-norbornene was added, and a gas mixture of ethylene (feed amount: 5 L/min)/propylene (feed amount: 5 L/min)/hydrogen (feed amount: 8 L/min) was fed continuously, with adding 24.7 mL of a 0.81 mol/L hexane solution of $Al_2(C_2H_5)_3Cl_3$ (20 mmol of $Al_2(C_2H_5)_3Cl_3$) as a polymerization catalyst. Next, 7.5 mL of a 0.40 mol/L hexane solution of $VCl_4$ (3.0 mmol of $VCl_4$) was added, and the copolymerization reaction of ethylene, propylene and 5-ethylidene-2-norbornene was conducted under condition of 25° C., 10 minutes. After termination of the reaction, 1,000 mL of water was added to the copolymer solution and stirred for 10 minutes, followed by recovering of only the copolymer solution (organic layer). The recovered copolymer solution was poured into a large amount of methanol to precipitate the copolymer, and 22.5 g of modified olefin copolymer (CA1) was obtained by drying treatment using a heated open mill.

In modified olefin copolymer (CA1), the amount of the structural unit derived from ethylene was 54.8 mol %, the amount of the structural unit derived from propylene was 44.4 mol %, and the amount of the structural unit derived from 5-ethylidene-2-norbornene was 0.7 mol %. Further, the molecular weight (Mw) was 40,000 determined in o-dichlorobenzene (ODCB) at 135° C. Furthermore, the intrinsic viscosity [η] was 0.7 measured in decalin at a temperature of 135° C.

Table 2 shows the analysis results of modified olefin copolymers (A7) to (A11) and (CA1).

TABLE 2

| Example | 11 | 12 | 13 | 14 | 15 | 16 |
|---|---|---|---|---|---|---|
| Copolymer No. | A7 | A8 | A9 | A10 | A11 | CA1 |
| Molecular weight (Mw) | 53,000 | 17,000 | 57,000 | 66,000 | 129,000 | 40,000 |
| Intrinsic viscosity [η]D1/g | 0.9 | 0.4 | 0.9 | 1.0 | 1.4 | 0.7 |
| C2 content (Mol %) | 65.8 | 64.8 | 69.0 | 69.0 | 67.5 | 54.8 |
| ENB content (Mol %) | 2.3 | 3.4 | 2.0 | 2.2 | 2.3 | 0.7 |
| (meth)acryloyl group content (eq. wt/molecule) | 6.6 | 4.6 | 11.7 | 20.4 | 12.1 | 0 |

EXAMPLE 16

19.8 g of modified copolymer (A7) obtained in Example 11, 0.2 g of trimethylol propane triacrylate (TMPTA), 0.2 g of 1-hydroxycyclohexyl phenyl ketone (Irgacure184) were weighed and kneaded together with a 3-roll open mill, degassed, then, a liquid curable rubber composition was obtained. The obtained composition was casted on polyester film at a thickness of 0.5 mm, and irradiated at a condition of 2,000 $mJ/cm^2$, using a conveyor equipment for ultraviolet light curing (manufactured by EYE GRAPHICS, Co. Ltd., lamp output 3 kW) under deoxdized air. After irradiation, a cured product was obtained. Results are shown in Table 3.

EXAMPLES 17 TO 21

Following the composition formulas shown in Table 3, in the same manner as Example 16, liquid curable rubber compositions were obtained. Results are shown in Table 3.

EXAMPLE 22

Following the composition formula shown in Table 3, a liquid curable rubber composition was obtained. The obtained composition was casted on polyester film in the same manner as Example 16, and crosslinked by means of electron beam at a condition of 1,000 kV accelerating voltage, and 300 kGy of irradiation amount. Result is shown in Table 3.

COMPARATIVE EXAMPLE 4

A rubber composition was obtained using modified olefin copolymer (CA1) prepared in Reference Example 1, following the composition formula shown in Table 3 in the same manner as Example 16. Ultraviolet light was irradiated in the same manner as Example 16. However, curability of the product was insufficient and satisfactory crosslinked product was not obtained because modified olefin copolymer (CA1) containing no (meth)acryloyl group was used in Comparative Example 4.

COMPARATIVE EXAMPLE 5

A rubber composition was obtained in the same manner as Comparative Example 4, using modified olefin copolymer (CA1) prepared in Reference Example 1, following the composition formula shown in Table 3 in the same manner as Example 22.

Electron beam was irradiated in the same manner as Example 22 using this composition. However, curability of the product was insufficient and satisfactory crosslinked product was not obtained because modified olefin copolymer (CA1) containing no (meth)acryloyl group was used in Comparative Example 5.

COMPARATIVE EXAMPLE 6

Using EP65 (ethylene-propylene rubber) manufactured by JSR Corporation in place of modified olefin copolymer (A7) and following the composition formula shown in Table 3 in the same manner as Example 16, a rubber composition was obtained. Ultraviolet light was irradiated onto the obtained composition in the same manner as Example 16 at the conditions shown in Table 3. Results are shown in Table 3. Owing to ordinary olefin rubber used in Comparative Example 6, the obtained composition did not turn into liquid state, and in addition, curability of the product was insufficient and physical properties of the crosslinked products were inferior.

COMPARATIVE EXAMPLE 7

Using methacryl group double-terminated polybutadiene TE-2000 manufactured by Nippon Soda Co., Ltd. in place of modified olefin copolymer (A7) and following the composition formula shown in Table 3 in the same manner as Example 16, a rubber composition was obtained. Ultraviolet light was irradiated onto the obtained composition in the same manner as Example 16 at the conditions shown in Table 3. Results are shown in Table 3. In the composition of Comparative Example 7, used polymer consists of polybutadiene linkage. The existence of excessive double bonds on the polymer backbone, which promote over-curing, causes the loss of elasticity.

COMPARATIVE EXAMPLE 8

Using polybutadiene having methacryl group as a side-chain (modification amount: 1.6 mol per a molecule) trade name: M-1000-80 manufactured by NIPPON PETROCHEMICALS CO., LTD. in place of modified olefin copolymer (A7), following the composition formula shown in Table 3 in the same manner as Example 16, a rubber composition was obtained.

Ultraviolet light was irradiated onto the obtained composition in the same manner as Example 16 at the conditions shown in Table 3.

Results are shown in Table 3. Same as in Comparative Example 7, the polymer of Comparative Example 8 consists of polybutadiene linkage. That is, Comparative Example 8 did not possess elasticity.

Same as in Comparative Example 7, the polymer contained in the composition of Comparative Example 8 has polybutadiene as its polymer backbone, that is to say, many double bonds reside in the polymer which excessively promotes curing, and the resulting crosslinked product does not have rubber elasticity.

In the Examples and the Comparative Examples, evaluation of casting properties and physical properties were conducted as follows.

(6) Casting Properties

In the process of casting the composition on film, when the casted composition has smooth surface and the casting load is low, it is evaluated as "good". When the casted composition has smooth surface but the casting load is high, it is evaluated as "fair", and when the composition has high viscosity and unable to cast, it is evaluated "poor".

(7) Physical Property Evaluation

Tensile strength $T_B$ (MPa), elongation at break $E_B$ (%) were measured according to JIS K6251 with exception that sheets having a thickness of 0.5 mm were used. Hardness (HS) test was conducted according to JIS K 6253 upon sample sheets having a thickness of 0.5 mm which stacked up more than 6 mm of thickness. In measuring compression set (C-set), test sample was prepared by cutting off a circular sheet having a diameter of 25 mm from a sheet having a thickness of 0.5 mm, and stacking 5 circular sheets. C-set was measured according to JIS K6262.

In Table 3, *1 indicates "No cross-linking" and *2 indicates "Unable to measure".

TABLE 3

| | Examples | | | | | | | Comparative Examples | | | | |
|---|---|---|---|---|---|---|---|---|---|---|---|---|
| | 11 | 12 | 13 | 14 | 15 | 16 | 17 | 4 | 5 | 6 | 7 | 8 |
| Composition formula (part) | | | | | | | | | | | | |
| A7 | 99 | 100 | 0 | 0 | 0 | 0 | 99 | 0 | 0 | 0 | 0 | 0 |
| A8 | 0 | 0 | 97 | 0 | 0 | 0 | 0 | 0 | 0 | 0 | 0 | 0 |
| A9 | 0 | 0 | 0 | 99 | 0 | 0 | 0 | 0 | 0 | 0 | 0 | 0 |
| A10 | 0 | 0 | 0 | 0 | 99 | 0 | 0 | 0 | 0 | 0 | 0 | 0 |
| A11 | 0 | 0 | 0 | 0 | 0 | 75 | 0 | 0 | 0 | 0 | 0 | 0 |
| CA1 | 0 | 0 | 0 | 0 | 0 | 0 | 0 | 99 | 99 | 0 | 0 | 0 |
| EP65 | 0 | 0 | 0 | 0 | 0 | 0 | 0 | 0 | 0 | 95 | 0 | 0 |
| TE-2000 | 0 | 0 | 0 | 0 | 0 | 0 | 0 | 0 | 0 | 0 | 99 | 0 |
| M-1000-80 | 0 | 0 | 0 | 0 | 0 | 0 | 0 | 0 | 0 | 0 | 0 | 99 |
| Dodecyl methacrylate | 0 | 0 | 0 | 0 | 0 | 20 | 0 | 0 | 0 | 0 | 0 | 0 |

TABLE 3-continued

|  | Examples | | | | | | | Comparative Examples | | | | |
|---|---|---|---|---|---|---|---|---|---|---|---|---|
|  | 11 | 12 | 13 | 14 | 15 | 16 | 17 | 4 | 5 | 6 | 7 | 8 |
| TMPTA | 1 | 0 | 3 | 1 | 1 | 5 | 1 | 1 | 1 | 5 | 1 | 1 |
| Irgacure184 | 1 | 1 | 1 | 1 | 1 | 1 | 0 | 1 | 0 | 1 | 1 | 1 |
| Irradiation amount | 2,000 mJ/cm² | 2,000 mJ/cm² | 2,000 mJ/cm² | 2,000 mJ/cm² | 2,000 mJ/cm² | 2,000 mJ/cm² | 300 kGy | 2,000 mJ/cm² | 300 kGy | 5,000 mJ/cm² | 2,000 mJ/cm² | 2,000 mJ/cm² |
| Evaluation | | | | | | | | | | | | |
| Casting properties | fair | fair | good | Fair | fair | good | fair | fair | fair | poor | fair | good |
| TB | 3.9 | 4.2 | 3.2 | 7.7 | 11.5 | 12.3 | 4.5 | −*1 | −*1 | 2 | 4 | 6 |
| EB | 100 | 120 | 90 | 90 | 50 | 120 | 100 | −*1 | −*1 | 350 | 55 | 30 |
| HS | 59 | 57 | 56 | 83 | 91 | 80 | 60 | −*1 | −*1 | 52 | 82 | 95 |
| C-set (70° C., 70 hr) | 9 | 13 | 15 | 4 | 1 | 30 | 7 | −*1 | −*1 | 10 | −*2 | −*2 |

What is claimed is:

1. An (meth)acryloyl group-modified ethylene-α-olefin copolymer, wherein said (meth)acryloyl group-modified ethylene-α-olefin copolymer has a (meth)acryloyl group as a side-chain thereof, and the intrinsic viscosity [η] of said (meth)acryloyl group-modified ethylene-α-olefin copolymer is in the range of 0.01 to 10 dl/g measured in decalin at a temperature of 135° C. wherein said (methacryloyl group-modified ethylene-α-olefin copolymer is provided by reacting a functional group-containing ethylene-α-olefin copolymer with a (meth)acryloyl group-containing compound, wherein said functional group-containing ethylene-α-olefin copolymer has at least one functional group selected from the group consisting of silyl group, hydroxyl group, alkoxyl group, amino group, carboxyl group, ester group, epoxy group, amide group, sulfone group, imido group, isocyanate group, and acid anhydride group, and wherein said at least one functional group is obtained from at least one compound other than an unconjugated polyene.

2. An (meth)acryloyl group-modified ethylene-α-olefin copolymer according to claim 1, wherein said (meth)acryloyl group-modified ethylene-α-olefin copolymer comprises said (meth)acryloyl group in an amount of 0.1 to 500 mmol per 100 g of said (meth)acryloyl group-modified ethylene-α-olefin copolymer.

3. An (meth)acryloyl group-modified ethylene-α-olefin copolymer according to claim 1, wherein said (meth)acryloyl group-containing compound is a compound represented by the following general formula (1);

(1)

wherein R¹ represents hydrogen atom or methyl group; "A" represents a hydrocarbon group having 1 to 20 carbon atoms which may comprise a hetero-atom, or "A" represents a single bond; X¹ represents silyl group, hydroxyl group, amino group, carboxyl group, epoxy group, amide group, sulfone group, imido group, isocyanate group, mercapto group, or a halogen atom; and "q" is an integer of 1 to 3.

4. An (meth)acryloyl group-modified ethylene-α-olefin copolymer according to claim 1, wherein said functional group-containing ethylene-α-olefin copolymer is a copolymer obtained by copolymerizing;

a compound represented by the following general formula (2);

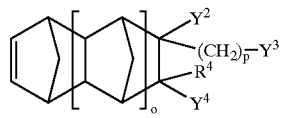

(2)

wherein R⁴ represents hydrogen atom or a hydrocarbon group having 1 to 10 carbon atoms; each of Y², Y³ and Y⁴, independently represents hydrogen atom, a hydrocarbon group having 1 to 10 carbon atoms, or a functional group selected from the group consisting of silyl group, hydroxyl group, alkoxyl group, amino group, carboxyl group or amide group, wherein at least one of Y², Y³ and Y⁴ is said functional group, wherein if two or more of Y², Y³ and Y⁴ are said functional groups, said two or more may be an acid anhydride group (—(CO)—O—(CO)—) or imido group (—CO—NH—Ca—) formed by bonding to each other; "o" is an integer of 0 to 2; and "p" is an integer of 0 to 5;

ethylene;

an α-olefin having 3 to 10 carbon atoms; and if necessary, an unconjugated polyene.

5. An (meth)acryloyl group-modified ethylene-α-olefin copolymer according to claim 4, wherein at least one of Y², Y³ and Y⁴ of said compound presented by said general formula (2) is a functional group represented by —SiR³ₘZ₃₋ₘ, wherein R³ represents hydrogen atom, or a hydrocarbon group having 1 to 20 carbon atoms which may comprise a hetero-atom, "z" represents a halogen atom selected from the group consisting of chlorine atom, bromine atom and iodine atom, and "m" is an integer of 0 to 2.

6. An (meth)acryloyl group-modified ethylene-α-olefin copolymer according to claim 1, wherein said functional group-containing ethylene-α-olefin copolymer is a copolymer obtained by copolymerizing;

a compound represented by the following general formula (3);

(3)

wherein Y¹ represents a functional group selected from the group consisting of silyl group, hydroxyl group, alkoxyl group, amino group, carboxyl group or amide group, d "n" is an integer of 0 to 6;

ethylene;

an α-olefin having 3 to 10 carbon atoms; and if necessary, an unconjugated polyene.

7. An (meth)acryloyl group-modified ethylene-α-olefin copolymer according to claim 6, wherein $Y^1$ of said compound represented by the general formula (3) is a functional group represented by $—SiR^3{}_mZ_{3-m}$, wherein $R^3$ represents hydrogen atom, or a hydrocarbon group having 1 to 20 carbon atoms which may comprise a hetero-atom, "z" represents a halogen atom selected from the group consisting of chlorine atom bromine atom and iodine atom, and "m" is an integer of 0 to 2.

8. An (meth)acryloyl group-modified ethylene-α-olefin copolymer according to claim 4, provided by reacting a (meth)acryloyl group-containing compound with said functional group-containing ethylene-α-olefin copolymer comprising 0.01 to 30 mol % of a structural unit (a–1) derived from a compound represented by said general formula (2), 5 to 90 mol % of a structural unit (a-2) derived from ethylene, 5 to 60 mol % of a structural unit (a-3) derived from an α-olefin having 3 to 10 carbon atoms, and 0 to 12 mol % of a structural unit (a-4) derived from an unconjugated polyene compound, wherein said functional group-containing ethylene-α-olefin copolymer has an intrinsic viscosity [η] in the range of 0.01 to 10 dl/g measure in decalin at a temperature of 135° C., and wherein said (methacryloyl group-containing compound is a compound represented by the following general formula (1):

(1)

wherein $R^1$ represents hydrogen atom or methyl group; "A" represents a hydrocarbon group having 1 to 20 carbon atoms which may comprise a hetero-atom, or "A" represents a single bond; $X^1$ represents silyl group, hydroxyl group, amino group, carboxyl group epoxy group, amide group, sulfone group, imido group, isocvanate group, mercapto group, or a halogen atom; and "q" is an integer of 1 to 3.

9. An (meth)acryloyl group-modified ethylene-α-olefin copolymer according to claim 6, provided by reacting a (meth)acryloyl group-containing compound with said functional group-containing ethylene-α-olefin copolymer comprising 0.01 to 30 mol % of a structural unit (a–1) derived from a compound represented by said general formula (3), 5 to 90 mol % of a structural unit (a-2) derived from ethylene, 5 to 60 mol % of a structural unit (a-3) derived from an a-olefin having 3 to 10 carbon atoms, and 0 to 12 mol % of a structural unit (a-4) derived from an unconjugated polyene compound, wherein said functional group-containing ethylene-α-olefin copolymer has an intrinsic viscosity [n] in the range of 0.01 to 10 dl/g measured in decalin at a temperature of 135° C. and wherein said (meth)acryloyl group-containing compound is a compound represented by the following general formula (1):

(1)

wherein $R^1$ represents hydrogen atom or methyl group: "A" represents a hydrocarbon having 1 to 20 carbon atoms which may comprise a hetero-atom, or "A" represents a single bond; $X^1$ represents silyl group, hydroxyl group, amino group, carboxyl group, epoxy group, amide group, sulfone group, imido group, isocyanate group, mercapto group or a halogen atom and "q" is an integer of 1 to 3.

10. A method of preparing an (meth)acryloyl group-modified ethylene-α-olefin copolymer, wherein a (meth) acryloyl group-containing compound is reacted with a functional group-containing ethylene-α-olefin copolymer having at least one functional group selected from the group consisting of silyl group, hydroxyl group, alkoxyl group, amino group, carboxyl group, ester group, epoxy group, amide group, sulfone group, imido group, isocyanate group, and acid anhydride groups wherein said at least one functional group is obtained from at least one compound other than an unconjugated polyene.

11. A method of preparing an (meth)acryloyl group-modified ethylene-α-olefin copolymer according to claim 10, wherein said (meth)acrylol group-containing compound is a compound represented by the following general formula (1);

(1)

wherein $R^1$ represents hydrogen atom or methyl group; "A" represents a hydrocarbon group having 1 to 20 carbon atoms which may comprise a hetero-atom, or "A" represents a single bond; X represents silyl group, hydroxyl group, amino group, carboxyl group, epoxy group, amide group, sulfone group, imido group, isocyanate group, mercapto group, or a halogen atom; and "q" is an integer of 1 to 3.

12. A method of preparing an (meth)acryloyl group-modified ethylene-α-olefin copolymer according to claim 10, wherein said functional group-containing ethylene-α-olefin copolymer is a copolymer obtained by copolymerizing;

a compound represented by the following general formula (2);

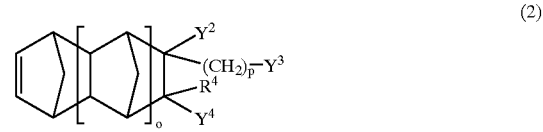

(2)

wherein $R^4$ represents hydrogen atom or a hydrocarbon group having 1 to 10 carbon atoms; each of $Y^2$, $Y^3$ and $Y^4$, independently represents hydrogen atom, a hydrocarbon group having 1 to 10 carbon atoms, or a functional group selected from the group consisting of silyl group, hydroxyl group, alkoxyl group, amino group, carboxyl group or amide group, herein at least one of $Y^2$, $Y^3$ and $Y^4$ is said functional group, wherein if two or more of $Y^2$, $Y^3$ and $Y^4$ are said functional groups, said two or more may be an acid anhydride group (—O—(O)—O—) or imido group (—CO—NH—CO—) formed by bonding to each other; "o" is an integer of 0 to 2; and "p" is an integer of 0 to 5;

ethylene;

an α-olefin having 3 to 10 carbon atoms; and if necessary, an unconjugated polyene.

13. A (meth)acryloyl group-modified ethylene-α-olefin copolymer-containing rubber composition, characterized in that said rubber composition comprises;

(A) a (meth)acryloyl group-modified ethylene-α-olefin copolymer according to claim 1, and (B) a vulcanizing agent and/or a crosslinking agent.

14. A (meth)acryloyl group-modified ethylene-α-olefin copolymer-containing rubber composition according to claim 13, wherein said rubber composition further comprises (C) an olefin copolymer rubber composition other than component (A).

15. A liquid curable rubber composition characterized in that said rubber composition comprises;
   (A) a (meth)acryloyl group-modified ethylene-α-olefin copolymer according to claim 1;
   (D) a reactive diluent; and if necessary,
   (E) a photopolymerization initiator.

16. A liquid curable rubber composition according to claim 15, wherein (D) a reactive diluent is a monomer having one or more (meth)acryloyl groups in a molecule thereof.

17. A liquid curable rubber composition according to claim 15, in which the weight ratio of component (E) is in a range of 0.01 to 10 parts based on total (100 parts) of component (A) and component (D), wherein the weight ratio of component (A) is 20 to 100 parts and the weight ratio of component (D) is 80 to 0 part.

18. A molded body, characterized in that said molded body is formed by subjecting a liquid curable rubber composition according to claim 15 to a light curing process or an electron-beam curing process.

19. A method of preparing an (meth)acryloyl group-modified ethylene-α-olefin copolymer according to claim 11, wherein said functional group-containing ethylene-α-olefin copolymer is a copolymer obtained by copolymerizing;

a compound represented by the following general formula (2);

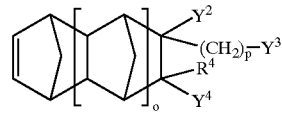

(2)

wherein $R^4$ represents hydrogen atom or a hydrocarbon group having 1 to 10 carbon atoms; each of $Y^2$, $Y^3$ and $Y^4$, independently represents hydrogen atom, a hydrocarbon group having 1 to 10 carbon atoms, or a functional group selected from the group consisting of silyl group, hydroxyl group, alkoxyl group, amino group, carboxyl group or amide group, herein at least one of $Y^2$, $Y^3$ and $Y^4$ is said functional group, wherein if two or more of $Y^2$, $Y^3$ and $Y^4$ are said functional groups, said two or more may be an acid anhydride group (—O—(CO)—O—) or imido group (—CO—NH—CO—) formed by bonding to each other; "o" is an integer of 0 to 2; and "p" is an integer of 0 to 5;

ethylene;

an α-olefin having 3 to 10 carbon atoms; and if necessary, an unconjugated polyene.

* * * * *